(12) United States Patent
Yoshida

(10) Patent No.: US 8,463,950 B2
(45) Date of Patent: Jun. 11, 2013

(54) INFORMATION PROCESSING APPARATUS, EXECUTION CONTROL METHOD, AND RECORDING MEDIUM STORING EXECUTION CONTROL PROGRAM

(75) Inventor: Fumiyuki Yoshida, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 13/137,737

(22) Filed: Sep. 8, 2011

(65) Prior Publication Data

US 2012/0066416 A1 Mar. 15, 2012

(30) Foreign Application Priority Data

Sep. 9, 2010 (JP) ................................ 2010-201763

(51) Int. Cl.
*G06F 3/00* (2006.01)
*G06F 13/28* (2006.01)

(52) U.S. Cl.
USPC ................................................ 710/7; 710/26

(58) Field of Classification Search
USPC ....................................................... 710/7, 26
See application file for complete search history.

(56) References Cited

U.S. PATENT DOCUMENTS

| 5,901,310 A * | 5/1999 | Rahman et al. ................... 713/1 |
| 6,058,474 A * | 5/2000 | Baltz et al. ........................ 713/1 |
| 6,721,822 B2 * | 4/2004 | Barry et al. ..................... 710/33 |
| 2003/0046371 A1 * | 3/2003 | Falkner .......................... 709/220 |
| 2007/0073988 A1 * | 3/2007 | Shibayama et al. .......... 711/165 |

FOREIGN PATENT DOCUMENTS

| JP | 2006-134025 A | 5/2006 |
| JP | 2008-299793 A | 12/2008 |
| JP | 2009099092 A * | 5/2009 |
| JP | 2009-175904 A | 8/2009 |

* cited by examiner

*Primary Examiner* — Farley Abad
(74) *Attorney, Agent, or Firm* — Harness, Dickey & Pierce, P.L.C.

(57) ABSTRACT

An information processing apparatus, an execution control method, an execution control program, and an execution control medium storing the execution control program are described. The information processing apparatus has a processor, which concurrently performs: (1) initializing hardware resources needed for execution of the information processing apparatus; and (2) expanding an operating system and a file system image stored in a nonvolatile memory in a compressed format and transferring the expanded operating system and file system image to a volatile memory using a direct memory access controller.

9 Claims, 21 Drawing Sheets

FIG. 20
| SECONDARY STORAGE BLOCK NUMBER | 4byte |
| TRANSFER DATA SIZE | 4byte |
| DESTINATION MEMORY ADDRESS | 4byte |
| CONTROL BIT | 4byte |
FIG. 21
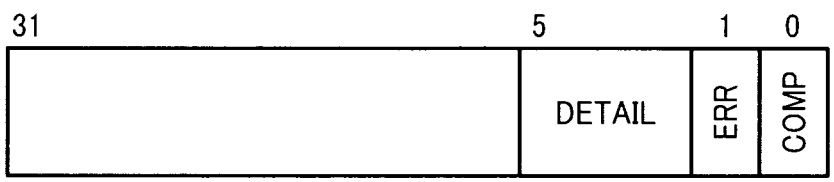
bit0 : COMP
bit1 : ERR
bit [2:5] : DETAIL
FIG. 22
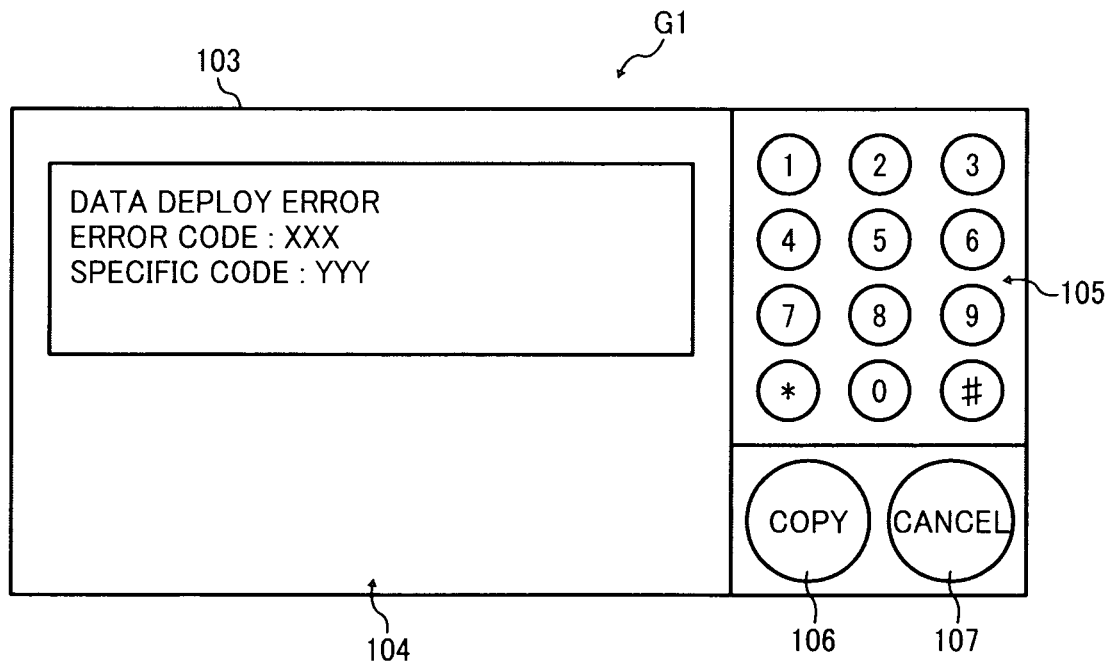

INFORMATION PROCESSING APPARATUS, EXECUTION CONTROL METHOD, AND RECORDING MEDIUM STORING EXECUTION CONTROL PROGRAM

CROSS-REFERENCE TO RELATED APPLICATIONS

This patent application is based on and claims priority under 35 U.S.C. §119 to Japanese Patent Application No. 2010-201763, filed on Sep. 9, 2010, in the Japan Patent Office, the entire disclosure of which is hereby incorporated herein by reference.

FIELD OF THE INVENTION

The present invention generally relates to an information processing apparatus, an execution control method, and a recording medium storing an execution control program, each of which is capable of reducing time required for execution of the information processing apparatus.

BACKGROUND

With the increased size of software and highly complicated hardware structures, time required for executing an information processing apparatus such as a computer, copier, multifunctional product (MFP), or embedded system tends to increase.

To reduce the execution time of the information processing apparatus, various approaches have been made. Japanese Patent Application Publication No. 2009-175904 describes a technique of reducing the execution time by causing a plurality of processors to concurrently transfer programs needed for execution from a memory, thus reducing the overall time for execution. This technique, however, prevents other software programs from using the processors until the programs are transferred. Further, providing the plurality of processors increases the overall manufacturing costs.

Japanese Patent Application Publication No. 2006-134025 describes a technique of increasing the processing speeds by setting initial set values of hardware resources and software resources in parallel, using a plurality of direct memory access controllers (DMACs). More specifically, the DMACs perform data setting in the order specified by a data setting command list that lists data setting commands to be executed by the plurality of DMACs. This technique has a drawback such that data setting may not be appropriately performed if the initialization conditions change.

Japanese Patent Application Publication No. 2008-299793 describes a technique of reducing the execution time by initializing a hardware controller before execution of a processor, specifically, by initializing a RAM controller before initialization of a CPU. Since initialization of the RAM only requires short time, such as 1 millieconds, only initializing the RAM beforehand does not contribute much to the decrease in execution time.

SUMMARY

In view of the above, one aspect of the present invention is to provide a technique of effectively reducing time required for writing software programs needed for execution from a nonvolatile memory onto a volatile memory of an information processing apparatus to reduce the execution time of the information processing apparatus.

One other aspect of the present invention is to provide a technique of increasing the processing speeds in installing software programs from an external device onto a nonvolatile memory of the information processing apparatus.

BRIEF DESCRIPTION OF THE DRAWINGS

A more complete appreciation of the disclosure and many of the attendant advantages and features thereof can be readily obtained and understood from the following detailed description with reference to the accompanying drawings, wherein:

FIG. 20 is an illustration for explaining an example descriptor generated by the controller section of the image forming apparatus of FIG. 16;

FIG. 21 is an illustration for explaining an example register used for determining whether DMA transfer is completed;

FIG. 22 is an illustration for explaining an operating system deployment error notification screen, displayed by the image forming apparatus of FIG. 16;

Figure 1:
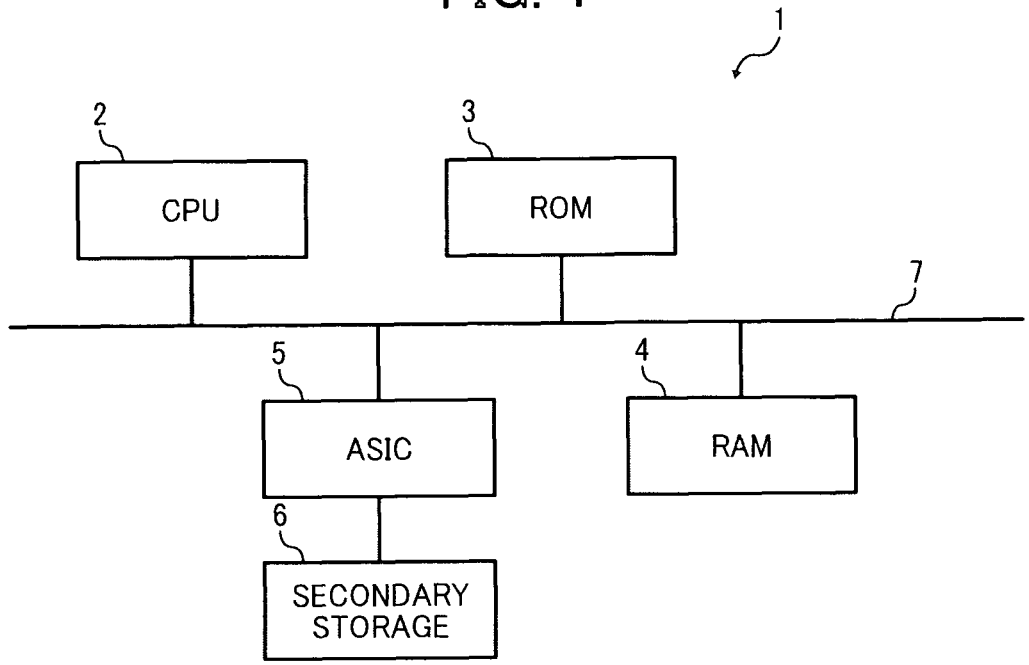
FIG. 1 is a schematic block diagram illustrating a structure of a controller section of an information processing apparatus according to an example embodiment of the present invention.

The accompanying drawings are intended to depict example embodiments of the present invention and should not be interpreted to limit the scope thereof. The accompanying drawings are not to be considered as drawn to scale unless explicitly noted.

DETAILED DESCRIPTION OF EXAMPLE EMBODIMENTS

The terminology used herein is for the purpose of describing particular embodiments only and is not intended to be limiting of the present invention. As used herein, the singular forms "a", "an" and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

In describing example embodiments shown in the drawings, specific terminology is employed for the sake of clarity. However, the present disclosure is not intended to be limited to the specific terminology so selected and it is to be understood that each specific element includes all technical equivalents that operate in a similar manner.

Referring now to FIGS. 1 to 15, an information processing apparatus, an execution control method, an execution control program, and a recording medium storing the execution control program are explained according to an example embodiment of the present invention.

FIG. 1 is a schematic block diagram illustrating a structure of a controller section of an information processing apparatus 1. In this example, the information processing apparatus 1 is implemented by a general-purpose computer such as a personal computer.

Referring to FIG. 1, the information processing apparatus 1 includes a central processing unit (CPU) 2, a read only memory (ROM) 3, a random access memory (RAM) 4, an Application Specific Integrated Circuit (ASIC) 5, and a secondary storage 6, which are connected through a bus 7.

The secondary storage 6, which may be implemented by a nonvolatile memory, stores therein a kernel (operating system) and a file system image in a compressed format. The ROM 3 stores therein an execution control program, such as a boot loader, which loads the operating system (OS) from the secondary storage 6 onto the RAM 4 for execution of the OS.

Figure 2:
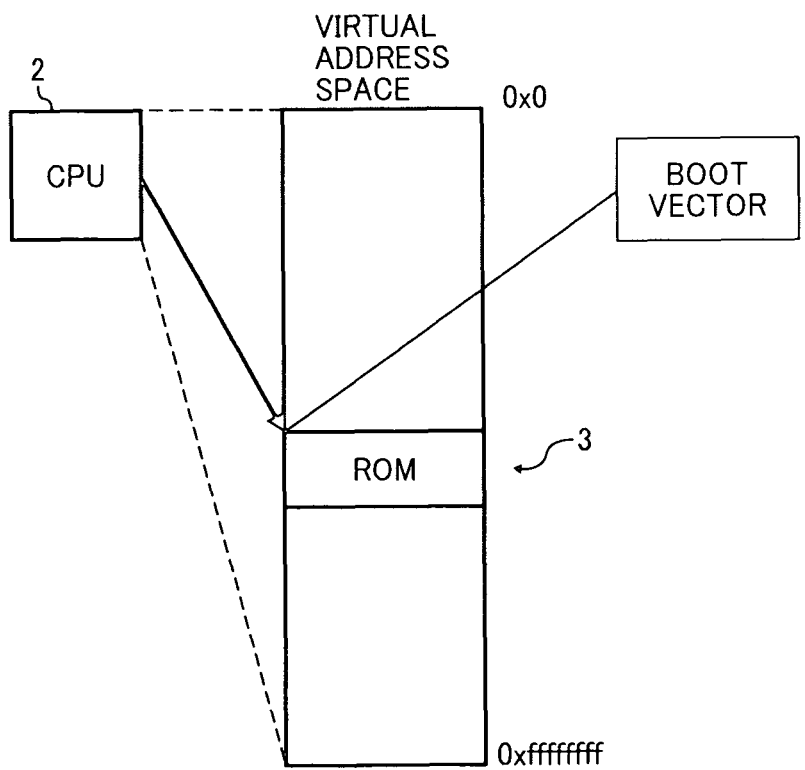
FIG. 2 is an illustration for explaining the correspondence between virtual address space of a CPU and a ROM of the information processing apparatus of FIG. 1.

As illustrated in FIG. 2, the ROM 3 is mapped to a virtual memory space of the CPU 2. The ROM 3 has a specific virtual address space that is allocated to a boot vector of the CPU 2. More specifically, the boot vector is the address space storing an instruction to be executed first as the power of the information processing apparatus 1 is turned on. The boot loader, which controls execution of the OS, is stored at the boot vector such that it is executed first as the power of the information processing apparatus 1 is turned on.

The information processing apparatus 1 executes the execution control program to perform the following operations of controlling execution of the information processing apparatus 1 so as to reduce execution time, by effectively reducing the time required for writing software needed for execution from the secondary storage 6 onto the RAM 4.

The execution control program may be previously stored in a computer readable recording medium such as a ROM, Electrically Erasable and Programmable ROM (EEPROM), EPROM, flash memory, flexible disk, compact disc read only memory (CD-ROM), compact disc rewritable (CD-RW), digital versatile disc (DVD), secure digital (SD) card, and magneto-optical disc (MO). When the execution control program is loaded from the recording medium onto a memory of the information processing apparatus 1 such as the ROM 3, the information processing apparatus 1 performs operation that can effectively reduce time required for writing software needed for execution onto a nonvolatile memory such as the RAM 4. The execution control program, which may be executable by a general-purpose computer, may be written in legacy programming language such as assembler, C, C++, C#, and Java, or object oriented programming. The execution control program may be stored in any desired recording medium for distribution as described above. Alternatively, the execution control program may be previously stored in a memory of any desired device or apparatus, from which the information processing apparatus 1 can download, for example, through a wired or wireless network.

The RAM 4 functions as a work memory of the CPU 2. The RAM 4 deploys therein the OS loaded from the secondary storage 6, and the file system image loaded from the secondary storage 6.

The CPU 2 is any desired processor such as a microprocessor. The CPU 2 controls various devices of the information processing apparatus 1 based on the OS deployed in the RAM 4 and application programs to cause the information processing apparatus 1 to perform various operations. The information processing apparatus 1 may be provide with any desired number of processors.

The ASIC 5 is provided between the secondary storage 6 and the bus 7. The ASIC 5 includes a direct memory access controller (DMAC), a compressor (encoder), and an expander (decoder). The ASIC 5 transfers data between the secondary storage 6 and the other devices such as the ROM 3 or the RAM 4 through the bus 7, using the DMAC. The ASIC 5 expands compressed data using the expander, or compresses data into compressed data using the compressor. Further, in this example, it is assumed that a plurality of DMACs 21a and 21b is provided, which may be collectively referred to as the DMAC.

Now, operation and function performed by the information processing apparatus 1 are explained according to an example embodiment of the present invention. The information processing apparatus 1 effectively reduces time required for writing software needed for execution onto the RAM 4, thus reducing the execution time of the information processing apparatus 1. The information processing apparatus 1 further reduces time required for installing software onto the secondary storage 6.

Figure 3:
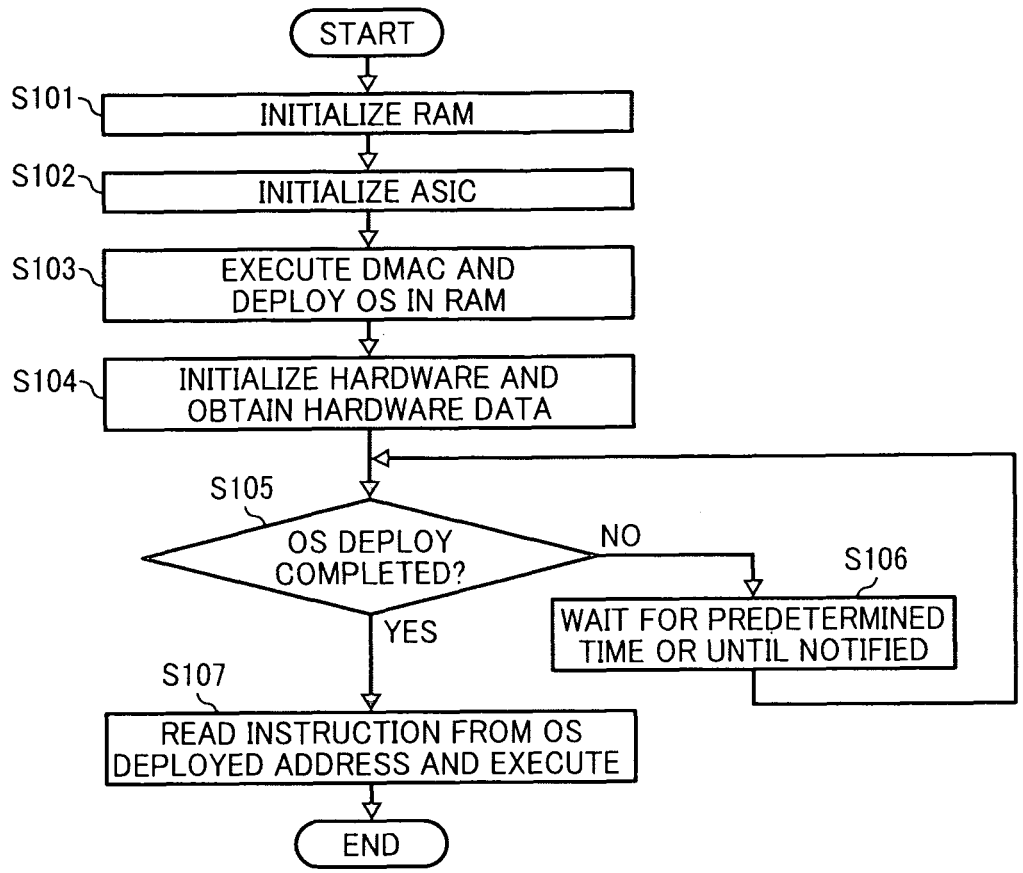
FIG. 3 is a flowchart illustrating operation of boot loader processing, performed by the information processing apparatus of FIG. 1.

As described above, the information processing apparatus 1 stores the execution control program such as the boot loader at the boot vector in the ROM 3. When the power of the information processing apparatus 1 is turned on, the CPU 2 executes the execution control program such as the boot loader at the boot vector in the ROM 3 (FIG. 2) to perform boot loader processing as illustrated in FIG. 3.

At S101, the CPU 2 initializes the RAM 4, that is, initializes the RAM controller. At S102, the CPU 2 initializes the ASIC 5.

At S103, the CPU 2 executes the ASIC 5 to expand the OS that is stored in the secondary storage 6 in a compressed format using the expander in the ASIC 5, and deploys the expanded OS in a specific space in the RAM 4 using the DMAC.

Figure 5:
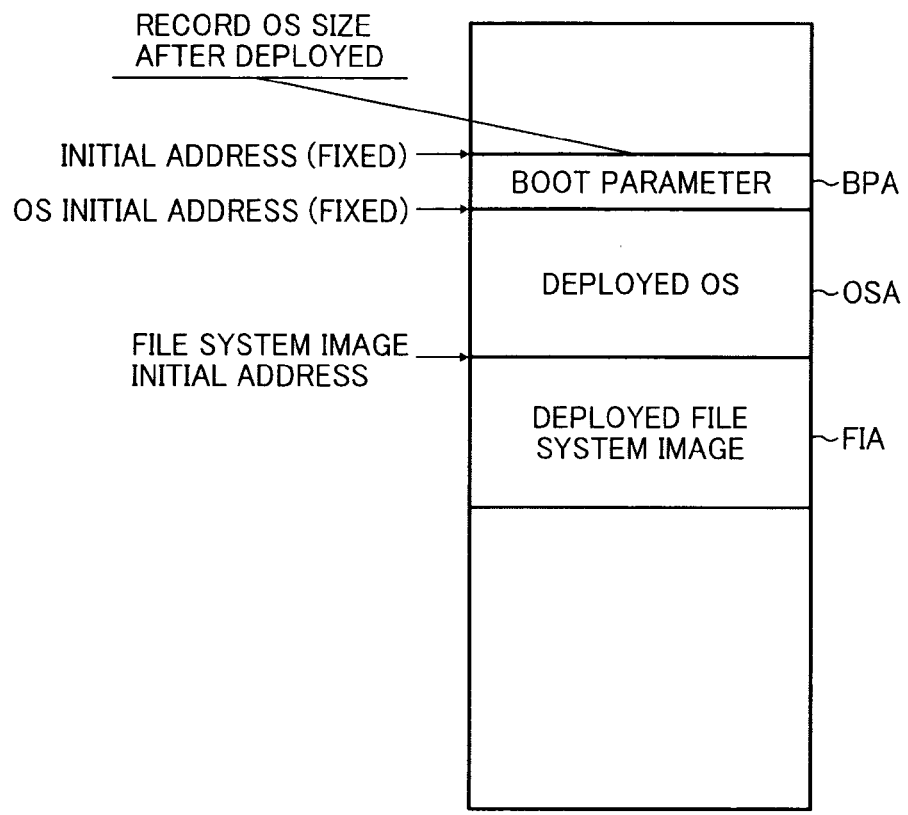
FIG. 5 is an illustration for explaining deploying data and storing parameters in the RAM of the information processing apparatus of FIG. 1.

As illustrated in FIG. 5 the CPU 2 deploys parameters for booting ("BOOT PARAMETER") in the boot parameter storage area BPA of the RAM 4, which starts at the fixed initial address that is previously determined. The CPU 2 deploys the expanded OS ("DEPLOYED OS") in the deployed OS area OSA, which starts at the fixed OS initial address that is previously determined. The CPU 2 deploys the file system image ("DEPOLYED FILE SYSTEM IMAGE") in the deployed file system image area FIA in the RAM 4, which follows the deployed OS area OSA. Operation of deploying the file system image is explained below referring to FIG. 7.

Figure 6:
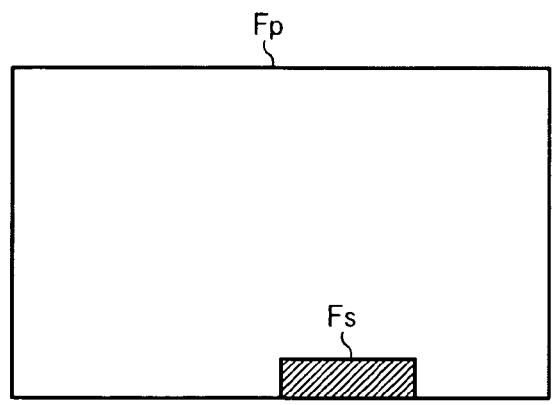
FIG. 6 is an illustration for explaining a format pattern of a compressed file in which the file size of the compressed file after being deployed is stored.

As described below, the OS deploys the file system image at a specific space in the RAM 4, which follows the space where the OS will be deployed by the boot loader. However, since the boot loader and the OS are separate programs, they cannot share variables such that the OS does not know the initial address of the deployed file system image area FIA. If the OS is deployed in a specific address space such that its end address is known, the OS can set its end address as the initial address of the deployed file system image area FIA. In order to know its end address, the OS needs to have information regarding its deployed size in addition to its previously determined initial address. More specifically, while the OS can arrange the file system image at a specific area, since the OS does not know its own size after being deployed, the OS does not know the initial address of the deployed file system image at least until deployment of the OS completes. In order to concurrently perform deployment of the OS by the boot loader and deployment of the file system image by the OS, the CPU 2 stores the size of the deployed OS in the boot parameter storage area BPA of FIG. 5 to be referred by the OS under control of the execution control program such as the boot loader. The OS size may be obtained from information regarding the deployed file size that is embedded in the compression file format, as the compression file format is required to have deployed file size information according to the standard specification. For example, as illustrated in FIG. 6, in case of gzip compression format, the compression file format pattern Fp has a deployed file size storage area Fs storing information regarding the deployed file size. The deployed file size storage area Fs is 4 byte in size, with its end address positioned right before the last eighth byte of the file format pattern Fp.

Referring back to FIG. 3, at S104, after starting deployment of the OS into the RAM 4, the CPU 2 starts initializing hardware resources other than the RAM 4 and the ASIC 5, and obtains information regarding the hardware resources. More specifically, in this example, expansion and deployment of the OS in the RAM 4 at S103 and initialization of hardware resources at S104 are concurrently performed, thus reducing time required for execution.

At S105, the CPU 2 determines whether deployment of the OS by the DMAC has completed, for example, using any one of the following methods.

In one method, the CPU 2 refers to a register in the ASIC, which monitors the state of the DMA, to determine whether any data is being transferred. This example method is described below referring to FIG. 21.

In another method, when the DMAC in the ASIC completes transferring, the DMAC controls an interruption signal that connects between the ASIC and the CPU 2 to notify the CPU 2 of interruption. The CPU 2 causes a specific process in the ROM 3 to change the flag value to release the waiting process. To implement this method, the ASIC is assumed to be provided with a function of controlling an interruption signal.

When it is determined that deployment of the OS is not completed ("NO" at S105), the operation proceeds to S106. At S106, the CPU 2 waits until a predetermined time period elapses, or until notification indicating interruption in the process is received.

When it is determined that deployment is completed ("YES" at S105), the operation proceeds to S107. At S107, the CPU 2 reads an instruction stored in the address where the OS is deployed to execute the instruction, and the operation ends.

As described above referring to S105, the CPU 2 is able to determine whether transfer, or deployment, of the OS is completed using any one of the above-described methods. In case when initialization of hardware resources at S104 is completed before completion of the OS deployment, the CPU 2 waits until completion of the OS deployment. Upon completion of the OS deployment, the CPU 2 executes the OS, for example, by reading an instruction from the deployed address. Assuming that the instruction is written in C language, a process at a specific address is called using a function pointer.

Figure 7:
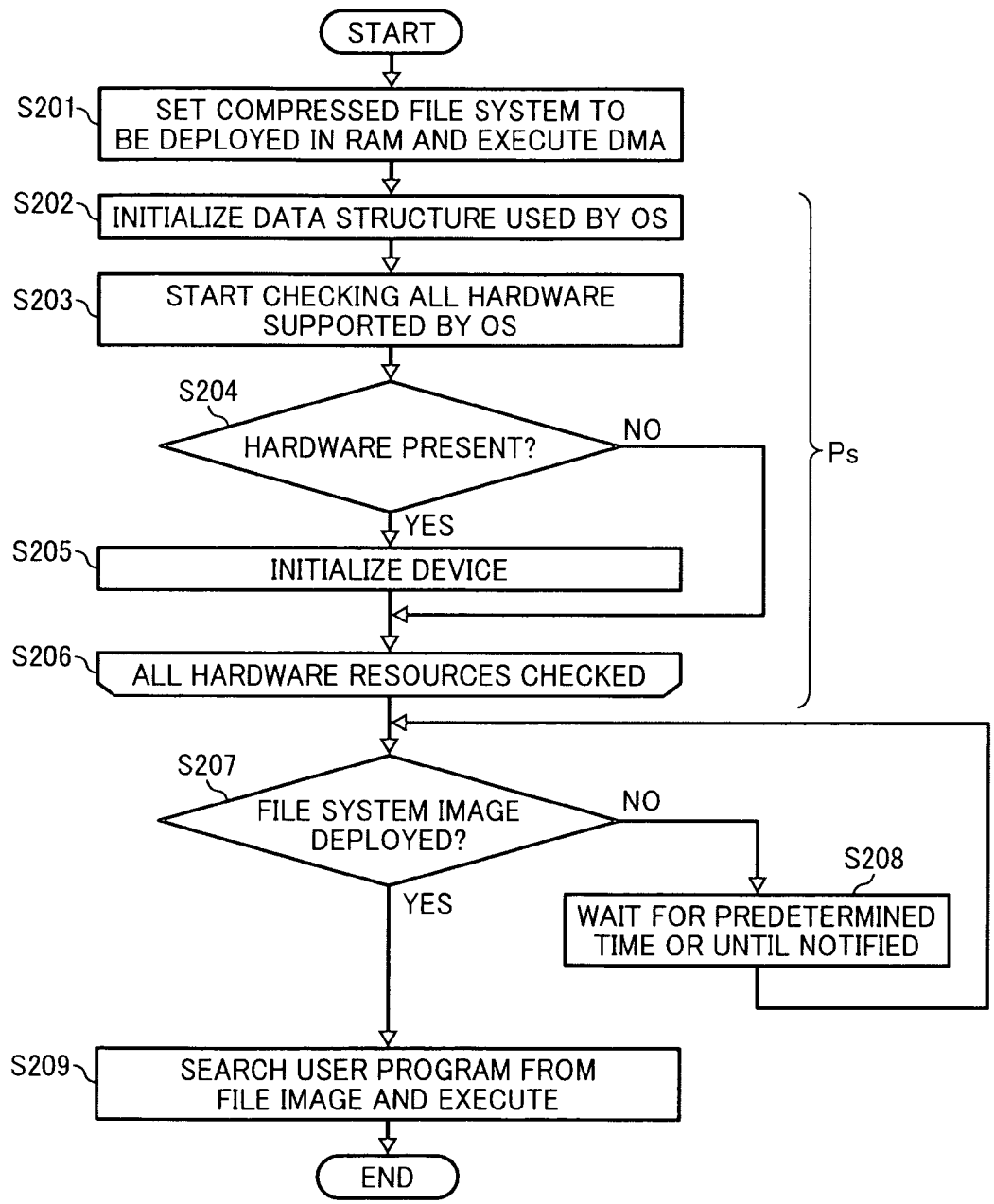
FIG. 7 is a flowchart illustrating executing the operating system, performed by the information processing apparatus of FIG. 1.

Referring now to FIG. 7, operation of executing the OS, performed by the information processing apparatus 1, is explained according to an example embodiment of the present invention. The operation of FIG. 7 is performed by the CPU 2 under control of the OS.

Figure 4:
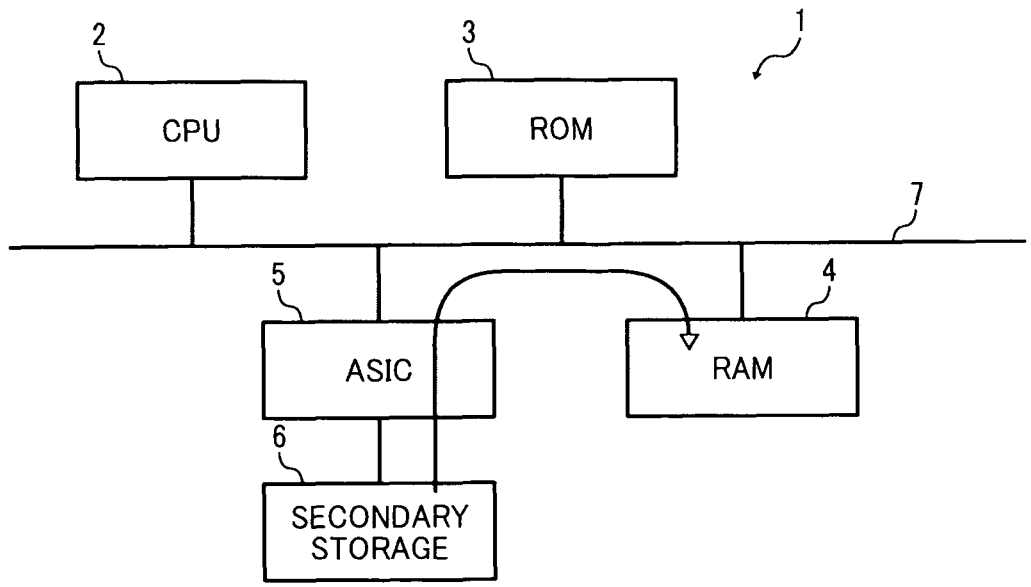
FIG. 4 is an illustration for explaining deploying an operating system from a secondary storage onto a RAM of the information processing apparatus of FIG. 1.

At S201, as illustrated in FIG. 4, the CPU 2 causes the DMAC of the ASIC 5 to deploy the file system image from the secondary storage 6 onto the RAM 4. As described above referring to FIG. 5, information regarding the position from which the file system image is written is obtained from the boot parameter storage area BPA.

At S202 to S206, the CPU 2 performs the operation Ps concurrently with the above-described operation of S201. At S202, the CPU 2 initializes a data structure used by the OS. At S203, the CPU 2 starts loop processing with respect to all hardware resources supported by the OS. At S204, the CPU 2 determines whether any hardware resource is present. When it is determined that the hardware resource is not present ("NO" at S204), the operation proceeds to S206. When it is determined that the hardware resource is present ("YES" at S204), the operation proceeds to S205 to initialize the hardware resource, or hardware device, that is determined to be present. At S206, the CPU 2 determines whether all hardware resources are checked. When it is determined that all hardware resources are checked, the operation proceeds to S207. When it is determined that there is at least one hardware resource that is not checked, the operation returns to S203 to repeat S203 to S205.

After all hardware resources are checked, the operation proceeds to S207 to determine whether deployment of the file system image by the DMAC at S201 is completed. When it is determined that deployment of the file system image is not completed ("NO" at S207), the operation proceeds to S208 to wait until a predetermined time period elapses or until notification indicating interruption in the process is received, and the operation returns to S207.

When it is determined that deployment of the file system image is completed ("YES" at S207), at S209, the CPU 2 searches a user program in the file system image, and executes the user program to cause the information processing apparatus 1 to perform various functions according to the user program, and the operation ends.

As described above referring to FIG. 7, expansion of the file system image in the RAM 4 performed by the DMAC and initialization of hardware resources performed by the OS are concurrently performed, thus reducing time required for execution of the information processing apparatus 1.

Further, as described above referring to FIG. 5, deployment of the OS and deployment of the file system image may be concurrently performed, for example, by using the plurality of DMACs, thus reducing time required for execution of the information processing apparatus 1.

In the above-described example, the hardware resources to be initialized at S104 of FIG. 3 and the hardware resources to be checked at S203 of FIG. 7 are previously determined. For the descriptive purposes these hardware resources may be referred to as hardware resources that are needed for execution of the information processing apparatus 1.

Further, the information processing apparatus 1 is able to install software from an external device onto its nonvolatile memory with improved processing speeds.

Figure 8:
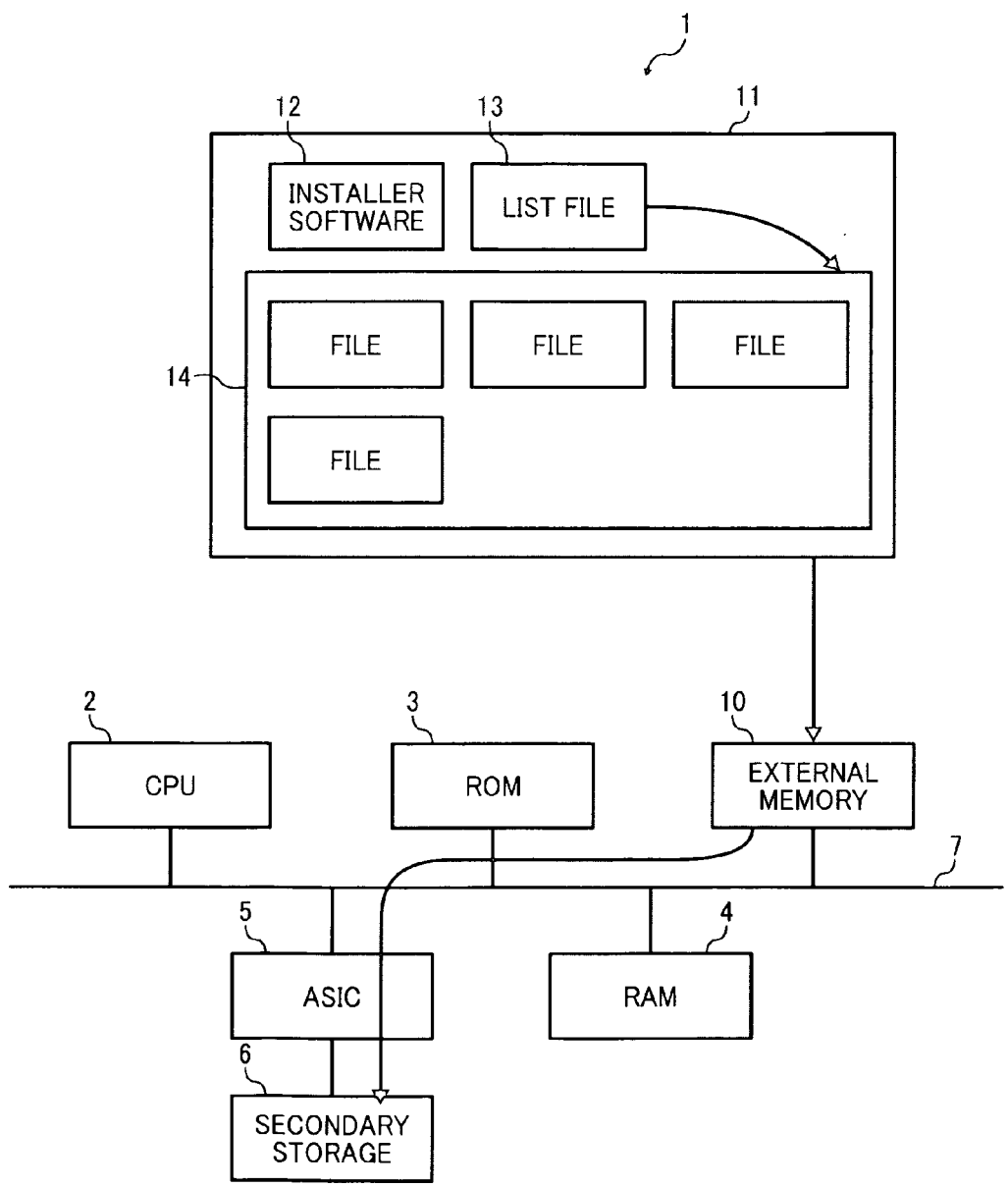
FIG. 8 is a schematic block diagram illustrating the structure of the controller section of the information processing apparatus of FIG. 1 to which an external device is connected.

As illustrated in FIG. 8, the information processing apparatus 1 may be connected to an external memory 10, which may be attached to or detached from the information processing apparatus 1. In this example, the external memory 10 is implemented by a secure digital (SD) card or universal serial bus (USB) memory. The information processing apparatus 1 is provided with an interface to which the external memory 10 is connected.

Alternatively, the external memory 10 may implemented by an external memory provided in an external apparatus, such as a computer, which is connected to the information processing apparatus 1 through a local area network (LAN) or the Internet.

Referring to FIG. 8, the external memory 10 is stored with an installer 11. The installer 11 includes installer software 12, a list file 13, and a collection of files ("files") 14. The list file 13 is a file that lists the names of the files 14, which are stored in uncompressed format and subjected for installation from the external memory 10 onto the secondary storage 6.

The installer software 12 controls installation of software such as installation of the files 14 through the CPU 2 of the information processing apparatus 1. As illustrated in FIG. 8, the installer software 12 copies each of the files 14 that are listed in the file list 13 in the secondary storage 6 of the information processing apparatus 1, while compressing each file 14 using the compressor of the DMAC in the ADIC 5.

Figure 9:
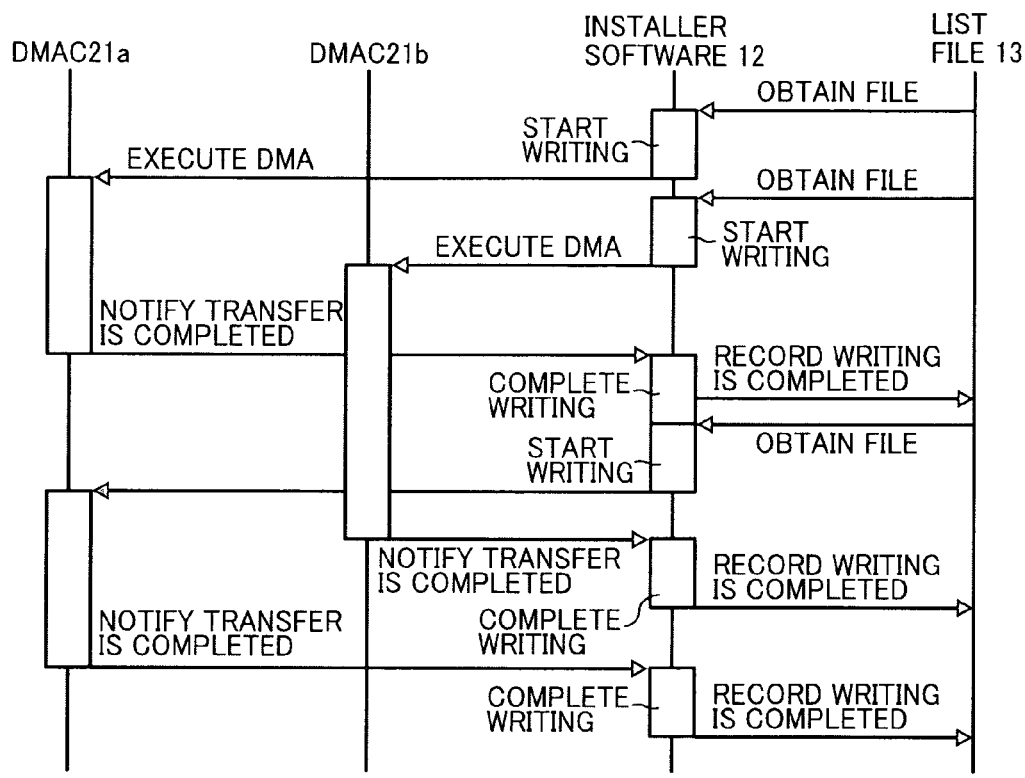
FIG. 9 is a data sequence diagram illustrating operation of installing software from the external device of FIG. 8 onto the secondary storage using a plurality of DMACs of the information processing apparatus of FIG. 1.

When copying the file 14 from the external memory 10 into the secondary storage 6 using the installer software 12, the information processing apparatus 1 performs this installation processing for more than one file concurrently using the plurality of DMACs in the ASIC 5. For example, as illustrated in FIG. 9, two DAMC 21a and DAMC 21b may be executed to concurrently perform installation of the files 14. With the use of the plurality of DMACs 21 that can currently perform installation, installation speeds increase.

The installer 11 installs the software, the files 14, into the secondary storage 6 using the plurality of DMACs in the ASIC 5 through DMAC transfer. In order to transfer the files 14 through DMAC transfer, a transfer destination space from which each file 14 is transferred, such as the start position and the size of the transfer destination space, needs to be specified. However, since the installer 11 installs the software, i.e., the files 14, in the secondary storage 6 through DMA transfer while compressing the software using the compressor in the ASIC 5, the size of the software after being compressed nor the start position from which the software is written is not known at the time of transferring. Unless the start position and the size of the transfer destination space are specified, it would not be possible to transfer the plurality of files 14 to the secondary storage 6, concurrently, using the DMAC 21a and 21b.

Figure 10:
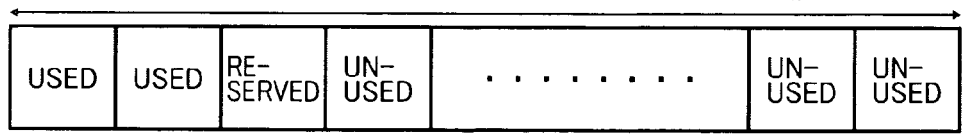
FIG. 10 is an illustration for explaining setting a variable to be used for installing software.

For the above-described reasons, as illustrated in FIG. 10, the installer software 12 sets the value of a variable H, and specifies the start position and the size of the transfer destination space in the secondary storage 6 using the variable H. The variable H indicates the usage status of each block in the secondary storage 6, which is classified into three usage statuses of "used", "unused", and "reserved". The "used" status indicates that the block is written with data such as the compressed file. The "unused" status indicates that the block is written with no data. The "reserved" status indicates that the block is temporarily reserved for writing of data such as the compressed file by DMAC. The usage status of the block is assigned to each block in the secondary storage 6 such that a number of usage statuses, or the variables H, corresponds to a number of blocks in the secondary storage 6.

Figure 11:
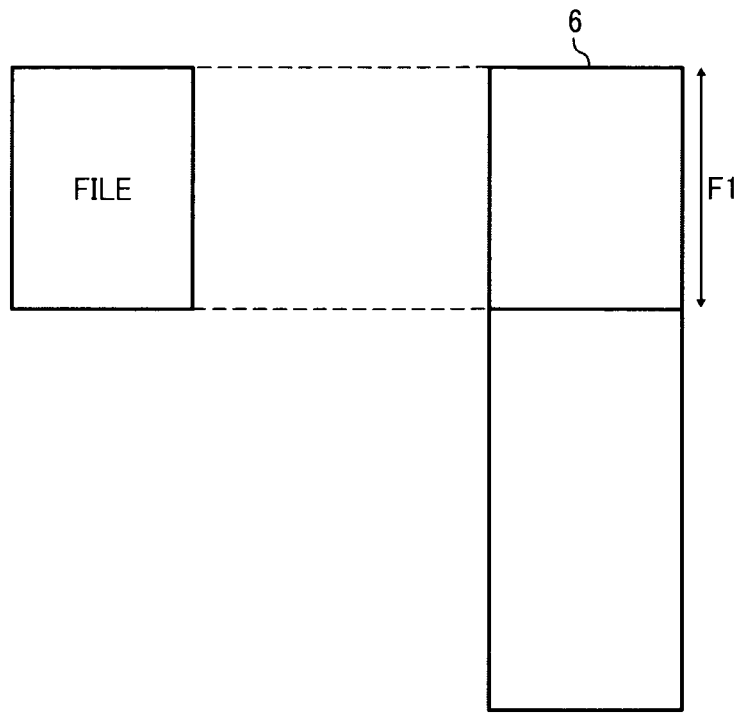
FIG. 11 is an illustration for explaining reserving a transfer destination space in the secondary storage to which a file of software is transferred after being compressed.

Referring to FIG. 11, when writing of the file 14 is started, the installer software 12 refers to the variable H in each block of the secondary storage 6 to find out the start position from which writing of the file 14 is started. More specifically, the installer software 12 looks for the block having the "unused" status to determine the start position. In order to determine the size of the transfer destination space, the installer software 12 considers a case in which file data cannot be compressed at all. More specifically, the size of the compressed file, which is the size of the file subjected for DMA transfer, is set equal to the size of the file before being compressed. In this manner, the installer software 12 obtains the start position and the size of the transfer destination space. The installer software 12 sets the variable H, which is the usage status, of the block from which writing is to be started, to the "reserved" status. As described above, the installer software 12 controls installation of software using the variable H.

Figure 12:
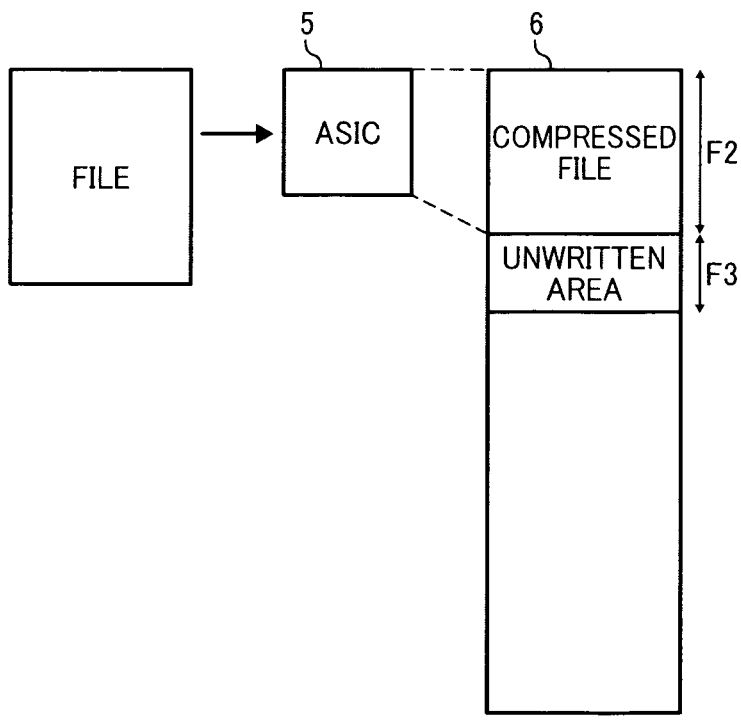
FIG. 12 is an illustration for explaining releasing of an unwritten area of the transfer destination space that is reserved, after transferring the compressed file to the transfer destination space.

After specifying the start position and the size of the transfer destination space, as illustrated in FIG. 9, the installer software 12 transfers the files 14 stored in the external memory 10 using the DMAC in the ASIC 5, while compressing the files 14 using the compressor in the ASIC 5. More specifically, as illustrated in FIG. 11, the file 14 is transferred and written in a block of the secondary storage 6 having the "reserved" status. As described above, one or more reserved blocks to which the file is transferred has a size "F1" that is equal to the size of the file before being compressed. When writing of the compressed file into the secondary storage 6 is completed, as illustrated in FIG. 12, the blocks having the "reserved" status in the secondary storage 6 may be classified into a section in which the compressed file is written ("COMPRESSED FILE"), and a section in which no file is written ("UNWRITTEN AREA"). Referring back to FIG. 10, the section in which the compressed file is written ("COMPRESSED FILE") is assigned with the "used" status, and the section in which no data is written ("UNWRITTEN AREA") is assigned with the "unused" status. In this manner, the installer software 12 is able to know, of the reserved blocks in the secondary storage 6, which section of the blocks is being used and which section of blocks is not used.

In case of transferring and writing the files 14 from the external memory 10 onto the secondary storage 6 concurrently using the DMACs 21a and 21b, as illustrated in FIG. 9, the installer software 12 requests the file list 13 to send information indicating a first file to be written from the group of files 14 ("OBTAIN FILE"). The installer software 12 obtains the first file, and starts writing the obtained first file in the secondary storage 6. The installer software 12 executes the first DMAC 21a in the ASIC 5 to cause the first file to be compressed ("EXECUTE DMA"), and refers to the variable H of each block in the secondary storage 6 to identify the first unused area of the secondary storage 6. The installer software 12 starts writing the compressed first file in the first unused area of the secondary storage 6.

In parallel to performing the above-described process, the installer software 12 refers to the listed file 13 to obtain information regarding a second file to be written from the group of files 14 ("OBTAIN FILE"), and obtains the second file to start writing the second file in the secondary storage 6. At this time, the installer software 12 executes the second DMAC 21b in the ASIC 5 to cause the second file to be compressed ("EXECUTE DMA"), and refers to the variable H of each block in the secondary storage 6 to identify the next following unused area of the secondary storage 6. The installer software 12 starts writing the compressed second file in the next following unused area of the secondary storage 6.

When writing of the compressed first file in the secondary storage 6 is completed, the DAMC 21a sends notification indicating that transfer is completed to the installer software 12 ("NOTIFY TRANSFER IS COMPLETED"). When the installer software 12 receives such notification, the installer software 12 performs writing completion processing as illustrated in FIG. 12 to record in the file list 13 that writing is completed ("RECORD WRITING IS COMPLETED"). After the installer software 12 records in the file list 13 that writing is completed, the installer software 12 refers to the file list 13 to obtain information indicating a next file subjected for writing from the group of files 14, and transfers the obtained file to the secondary storage 6 using the DMAC 21a.

When writing of the compressed second file in the secondary storage 6 is completed, the DMAC 21b sends notification indicating that transfer is completed to the installer software 12 ("NOTIFY TRANSFER IS COMPLETED"). The installer software 12 performs further processing in a substantially similar manner as described above in the case of the first compressed file.

Figure 13:
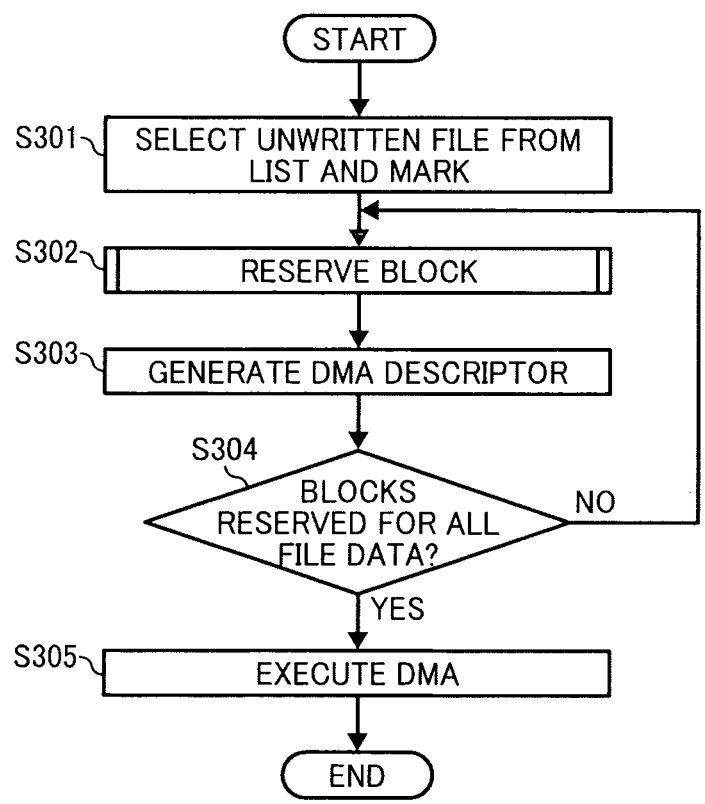
FIG. 13 is a flowchart illustrating operation of writing the compressed file to the secondary storage, performed by the information processing apparatus of FIG. 1.
Figure 15:
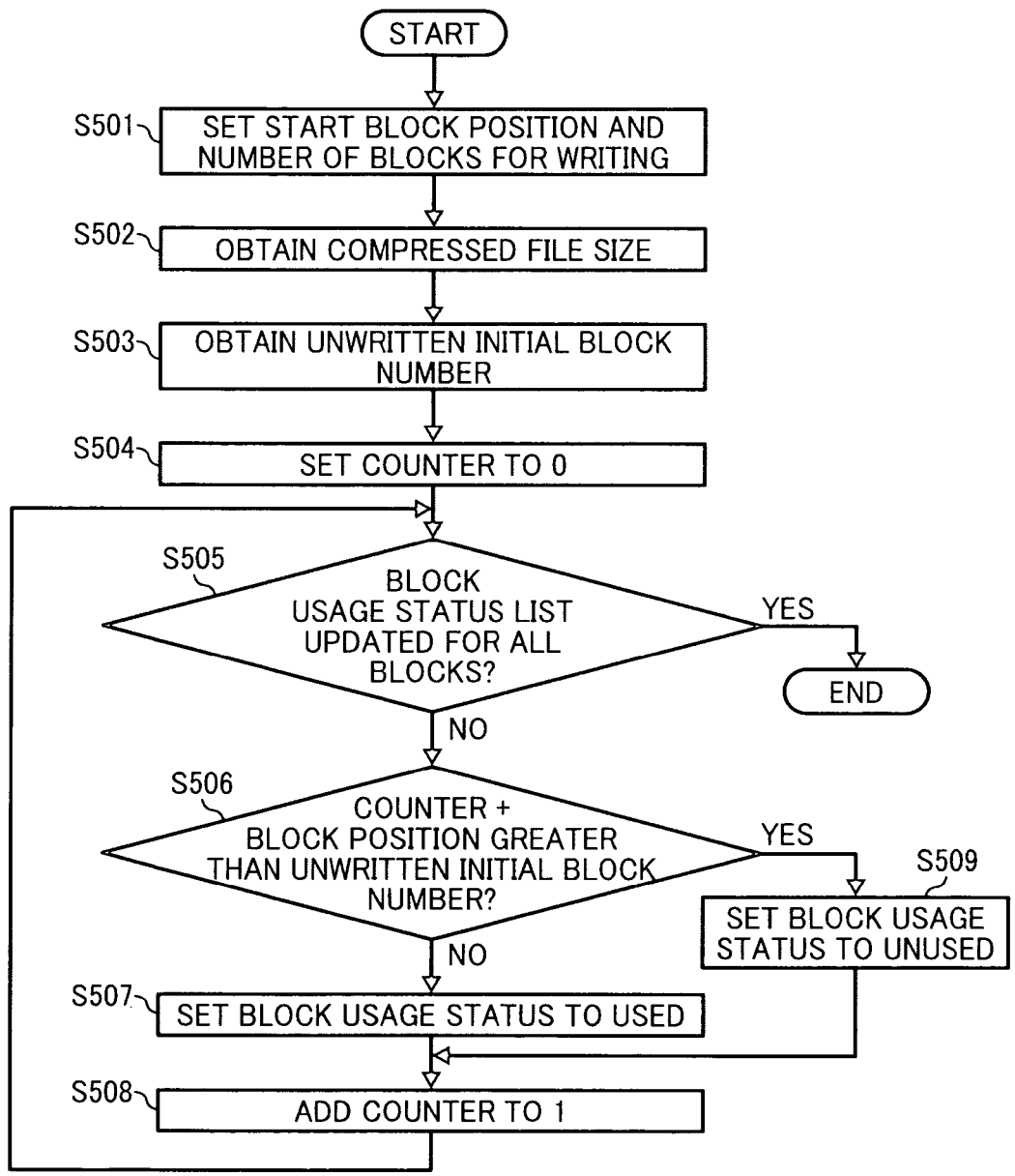
FIG. 15 is a flowchart illustrating operation of completing processing of writing the file of software, performed by the information processing apparatus of FIG. 1.

Referring now to FIGS. 13 and 15, operation of writing software, performed by the CPU 2 under control of the installer software 12, is explained in more detail according to an example embodiment of the present invention.

FIG. 13 illustrates operation of writing files, performed by the installer software 12.

At S301, the installer software 12 selects a file, which is not written, from the file list 13, and assigns the "writing" status to the obtained file. At S302, the installer software 12 reserves one or more blocks in the secondary storage 6, as described below referring to FIG. 14.

At S303, after reserving the blocks for writing, the installer software 12 generates a DMA descriptor using the start position of the blocks that have been reserved and a number of blocks that have been reserved. At S304, using the descriptor, the installer software 12 determines whether all blocks are reserved for the file to be transferred, for example, by checking whether the reserved blocks have a size equal to or greater than the file size of the uncompressed file to be transferred.

When it is determined that all blocks are not reserved at S304 ("NO" at S304), the operation returns to S302 to perform S302 to S304.

When it is determined that all blocks are reserved at S304 ("YES" at S304), the operation proceeds to S305. At S305, the installer software 12 executes the DMAC to start transferring the file through DMA transfer, and the operation of writing the file ends.

Figure 14:
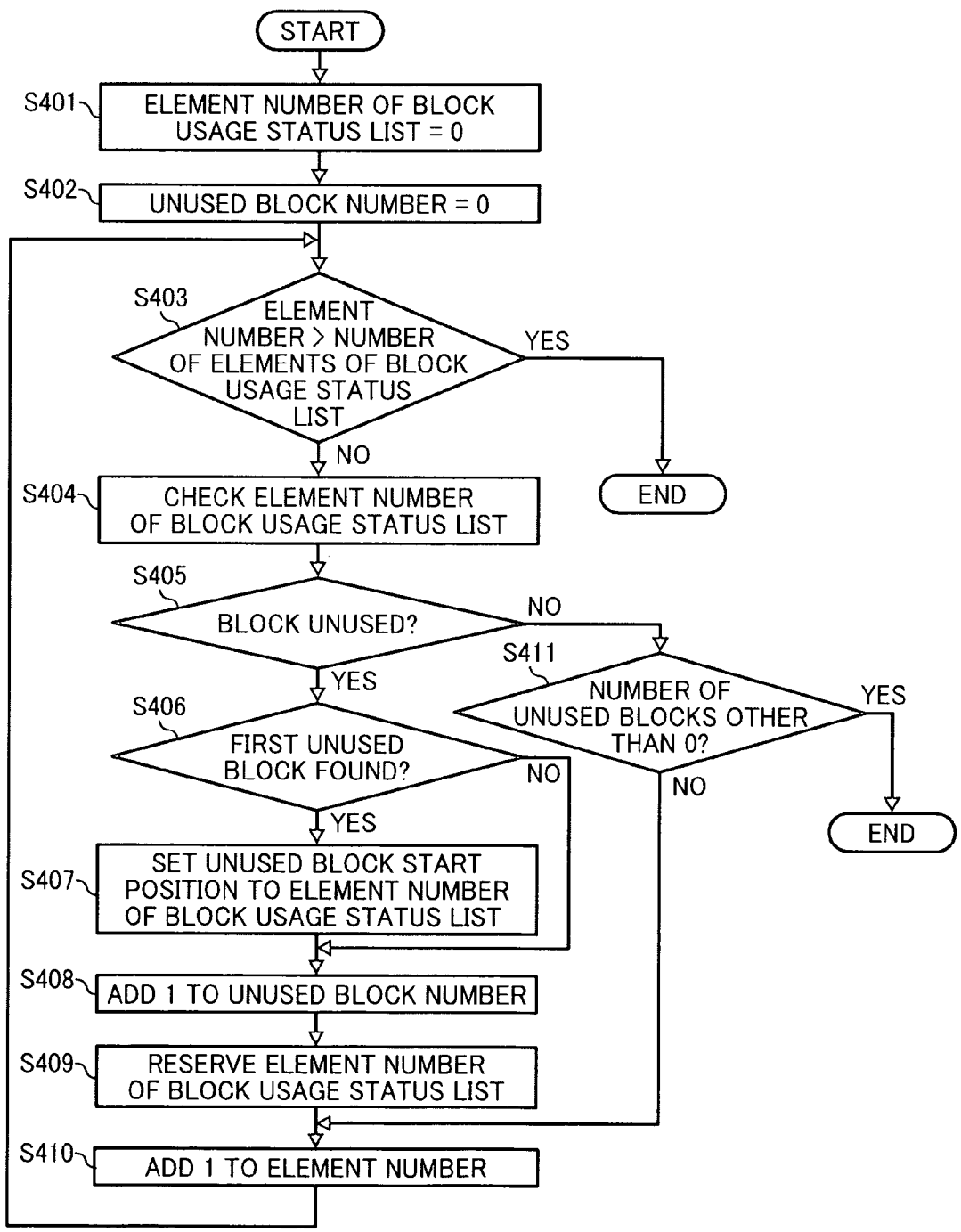
FIG. 14 is a flowchart illustrating operation of reserving the transfer destination area to which the file of software is transferred after being compressed, performed by the information processing apparatus of FIG. 1.

Referring now to FIG. 14, operation of reserving a block for the file to be written is explained. The installer software 12 performs operation of FIG. 14 at S302 of FIG. 13, using a block usage status list that stores information regarding the start position and the size of the blocks that are reserved for writing software.

At S401, the installer software 12 sets an element number of the block usage status list to "0". At S402, the installer software 12 sets a number of unused blocks to "0".

At S403, the installer software 12 determines whether a current element number in the block usage status list is greater than a total number of elements in the block usage status list. By comparing the current element number with the total number of elements, the installer software 12 is able to determine whether all blocks have been for writing the file.

In this example, the total number of elements in the block usage status list is determined based on a size of the file to be written. For example, the file to be written may be divided into a plurality of sections, or blocks, each having a predetermined unit size that corresponds to the predetermined unit size of each block in the secondary storage 6. The total number of elements is obtained from a number of blocks divided from the file.

At S403, when it is determined that current element number does not exceed the total number of elements ("NO" at S403), the operation proceeds to S404. The installer software 12 checks the current element number in the block usage status list at S404, and determines whether the block corresponding to the checked element number is "unused" at S405.

When it is determined that the block is unused at S405 ("YES" at S405), at S406, the installer software 12 determines whether the "unused" block is a first "unused" block that is firstly found after this operation of reserving a block is called. When it is determined that the "unused" block is the first "unused" block ("YES" at S406), the operation proceeds to S407. At S407, the installer software 12 sets the position from which the first unused block is started to the current element number of the block usage status list at S407. At S408, the installer software 12 adds "1" to the number of unused blocks.

When it is determined that the "unused" block is not the first "unused" block ("NO" at S406), the operation proceeds to S408 to add "1" to the number of unused blocks, without setting the element number of the block usage status list.

At S409, the installer software 12 sets a block in the second storage 6 that corresponds to the current element number to the "reserved" status, for example, by setting the element of the block usage status list having the current element number to the "reserved" status. At S410, the installer software 12 adds "1" to the current element number. The operation then returns to S403 to repeat S403 to S410 until the current element number exceeds the total number of elements in the block usage status list. When it is determined that the current element number exceeds the total number of elements ("YES" at S403), the operation ends to proceed to S303 of FIG. 13. Since all blocks are reserved, at S304, it is determined that all blocks are reserved.

At S405, when the block is not "unused" ("NO" at S405), the operation proceeds to S411 to determine whether the number of unused blocks is other than "0", that is, determine whether the continuous unused blocks would be broken or interrupted. When it is determined that the number of unused blocks is "0" ("NO" at S411), the operation proceeds to S410 to add "1" to the element number.

At S411, when it is determined that the number of unused blocks is other than "0" ("YES" at S411), the installer software 12 determines that the continuous unused blocks would be broken, and the operation ends to proceed to S303 of FIG. 13. Since blocks are not reserved, it is determined that all blocks are not reserved at S304.

With the operation of FIG. 14, the installer software 12 determines the start position and the number of blocks for writing the file, and generates the DMA descriptor based on such information at S303 of FIG. 14.

Referring now to FIG. 15, operation of completing file writing processing, performed by the CPU 2 under control of the installer software 12, is explained. The installer software 12 performs operation of FIG. 15 after completing operation of writing the file described above referring to FIG. 13. More specifically, referring to FIG. 9, when the installer software 12 receives notification from the DMAC 21 that transfer of the file is completed, the installer software 12 performs operation of FIG. 15.

At S501, the installer software 12 refers to the DMA descriptor, which is generated at S303 of FIG. 13, to obtain the position of the blocks from which writing is started ("writing start block position"), and a number of blocks being written. At S502, the installer software 12 accesses the secondary storage 6 to obtain the size of the compressed file ("F2" of FIG. 12).

At S503, the installer software 12 subtracts the file size of the compressed file obtained at S502 ("F2" of FIG. 12) from the file size of the uncompressed file before being compressed ("F1" of FIG. 12) to obtain a number assigned to the first block in the unwritten area.

At S504, the installer software 12 sets a counter value to "0". At S505, the installer software 12 determines whether the block usage status list is updated for the total number of blocks being written. The total number of blocks being written is obtained from the descriptor at S501.

When it is determined that the block usage status list is not updated for all number of blocks being written ("NO" at S505), the operation proceeds to S506. At S506, the installer software 12 determines whether the value obtained by adding the writing start block position obtained at S501 to the counter value is greater than the first block number of the unwritten area obtained at S503.

When it is determined that the value obtained by adding the writing start block position to the counter value is less than the first block number of the unwritten area ("NO" at S506), the installer software 12 determines that the counter has not counted up from the position from which writing of the file is started to the end of the file where the unwritten area starts. The installer software 12 thus determines that the current block is in which the file is written, and the operation proceeds to S507. At S507, the installer software 12 sets the current element of the block usage status list to the "used" status. At S508, the installer software 12 adds "1" to the counter value, and the operation returns to S505 to repeat S505 to S508.

At S506, when it is determined that the value obtained by adding the writing start block position to the counter value is greater than the first block number of the unwritten area ("YES" at S506), the installer software 12 determines that the counter has counted up from the position from which writing of the file is started to the end of the file where the unwritten area starts. The installer software 12 thus determines that the current block is not written with a file, and the operation proceeds to S509. At S509, the installer software 12 sets the current element of the block usage status list to the "unused" status. At S508, the installer software 12 adds "1" to the counter value, and the operation returns to S505 to repeat S505 to S508.

When it is determined that the block usage status list is updated for all blocks for writing at S505 ("YES" at S505), the installer software 12 ends the operation of completing file writing processing.

As described above referring to FIG. 7, the information processing apparatus 1 performs initialization of hardware resources needed for execution, and DMA transfer of the operating system and the file system image, concurrently. In DMA transfer, the information processing apparatus 1 executes a plurality of DMACs in the ASIC 5 to expand the OS and the file system image stored in the nonvolatile memory such as the secondary storage 6 using the expander in the ASIC 5, and transfers the expanded OS and file system to the volatile memory such as the RAM 4.

In this manner, at the same time the CPU 1 executes software, the CPU 2 is able to deploy the OS and the file system image from the secondary storage 6 into the RAM 4 using the plurality of DMACs, thus executing the information processing apparatus 1 at high speeds.

The information processing apparatus 1 is set so as to start writing the expanded OS at a predetermined fixed writing start position in the RAM 4, and writes information regarding the size of the deployed operating system in the RAM 4. Using the writing start position and the size of the expanded operating system, the information processing apparatus 1 determines the end address of the space where the operating system is written, and sets the determined end address to a position from which the file system image is written.

In this manner, the information processing apparatus 1 is able to correctly know the space where each file, such as the OS and the file system image, is to be deployed in the memory beforehand, thus allowing the effective use of the memory space while suppressing data from being overwritten.

Further, in the above-described example, when initialization of the hardware resources ends before completion of transfer of the operating system, the information processing apparatus 1 holds execution of the operating system at least until transfer of the operating system is completed. For example, even if processing of software executed by the CPU 2 ends before deployment of the OS by DMAC, the CPU 2 waits until deployment of the OS is completed. This prevents the CPU 2 from using any file that may not have been deployed in error, thus improving robustness of the information processing apparatus 1.

The information processing apparatus 1 executes the plurality of DMACs in parallel to cause the DMACs to transfer the operating system and the file system image from the secondary storage 6 to the RAM. Accordingly, the OS to be executed can be deployed from the secondary storage 6 onto the RAM 4 with increased speeds.

The information processing apparatus 1 executes the plurality of DMACs 21a and 21b, concurrently, to compress the software, the files 14, stored in the external device such as the external memory 10 using the compressor, and install the compressed files 14 into the secondary storage 6. Accordingly, the information processing apparatus 1 is able to install the files 14 needed for execution of the information processing apparatus 1 from the external device onto the secondary storage 6, with increased speeds at least when compared with the case where installation is performed only by the CPU 2.

The information processing apparatus 1 divides the file 14 stored in the external memory 10 into a plurality of blocks each having a predetermined size. The information processing apparatus 1 executes the plurality of DMACs 21a and 21b, concurrently, to compress each block of the file using the compressor, and install the compressed block onto the secondary memory 6. The information processing apparatus 1 reserves a transfer destination space having a block unit size of the file 14 by setting the variable H to the "reserved" status. When the block of the compressed file 14 is transferred to the transfer destination space, an unused area of the transfer destination space that has been reserved is released for use as a transfer destination space for another file.

Thus, it is not necessary to perform the following sequential operation for each file at a time, such as copying a current file onto the secondary storage 6, obtaining the end address of the copied file, and copying a next file from the end address. In contrary, in the above-described example, the installer software 12 is able to know which block is being used based on the variable H assigned to each block such that a plurality of DMACs may be executed to concurrently perform operation of copying a plurality of files.

Further, the information processing apparatus 1 may divide the file 14 stored in the external memory 10 into a plurality of unit blocks each having a predetermined size, and execute a plurality of DMACs 21a and 21b to concurrently install the plurality of blocks of the file in a compressed format onto the secondary storage 6. Even if the file size of the block after being compressed is not known, the position from which writing of the block starts, and the size of the block, may be specified.

Figure 16:
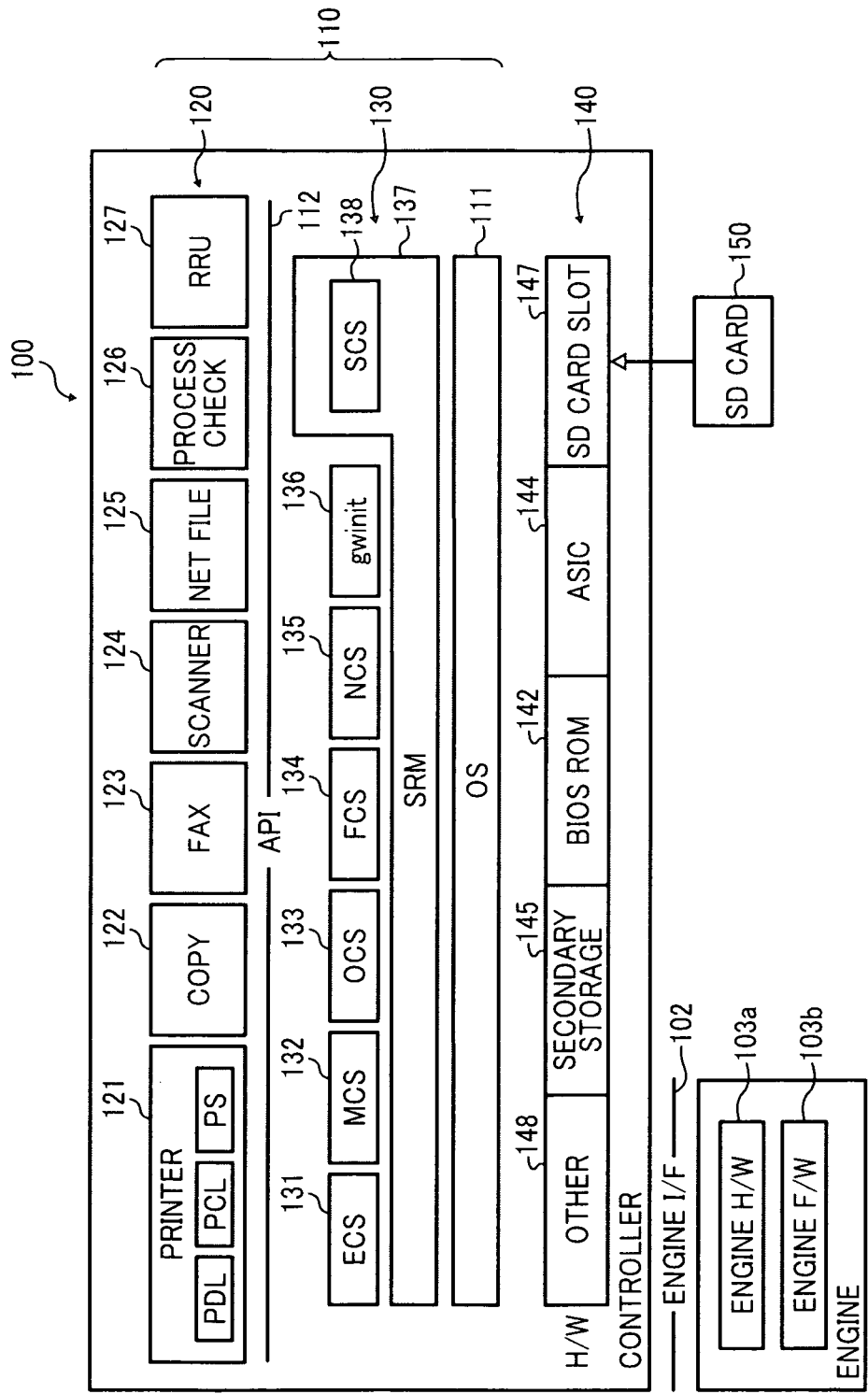
FIG. 16 is a schematic block diagram illustrating a structure of an image forming apparatus, according to an example embodiment of the present invention.

Referring now to FIGS. 16 to 29, an information processing apparatus, an execution control method, an execution control program, and a recording medium storing the execution control program are explained according to an example embodiment of the present invention. FIG. 16 is a schematic block diagram illustrating a structure of a controller section of an image forming apparatus 100, which is an example of the information processing apparatus. The image forming apparatus 100 is a multifunctional printer (MFP), which is capable of performing the functions of printing, copying, facsimile communication, data communication, etc.

Referring to FIG. 16, the image forming apparatus 100 includes a controller 101, which is connected to an engine 103 through an engine interface (I/F) 102. The image forming apparatus 100 further includes an operation unit (FIG. 22) that allows a user to input various instructions or displays various information to the user.

The engine 103 includes engine hardware (engine H/W) 103a, and engine software such as engine software (engine F/W) 103b. The engine 103 forms an image on a recording sheet based on bit map data received from the controller 101, using a predetermined image forming method such as electrophotographic method.

Figure 17:
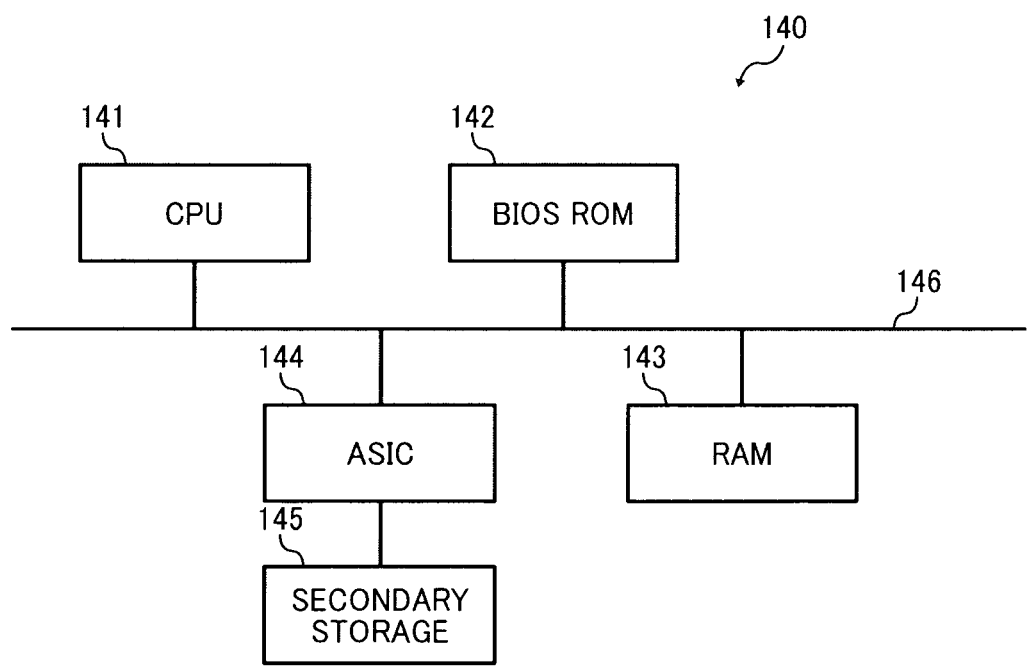
FIG. 17 is a schematic block diagram illustrating a hardware structure of a controller section of the image forming apparatus of FIG. 16.

The controller 101 mainly includes a group of software 110 and hardware resources 140. As illustrated in FIG. 17, the hardware resources 140 include a central processing unit (CPU) 141, a basic input output system (BIOS) ROM 142, a RAM 143, an ASIC 144, and a secondary storage 145, which are connected through a bus 146.

Figure 18:
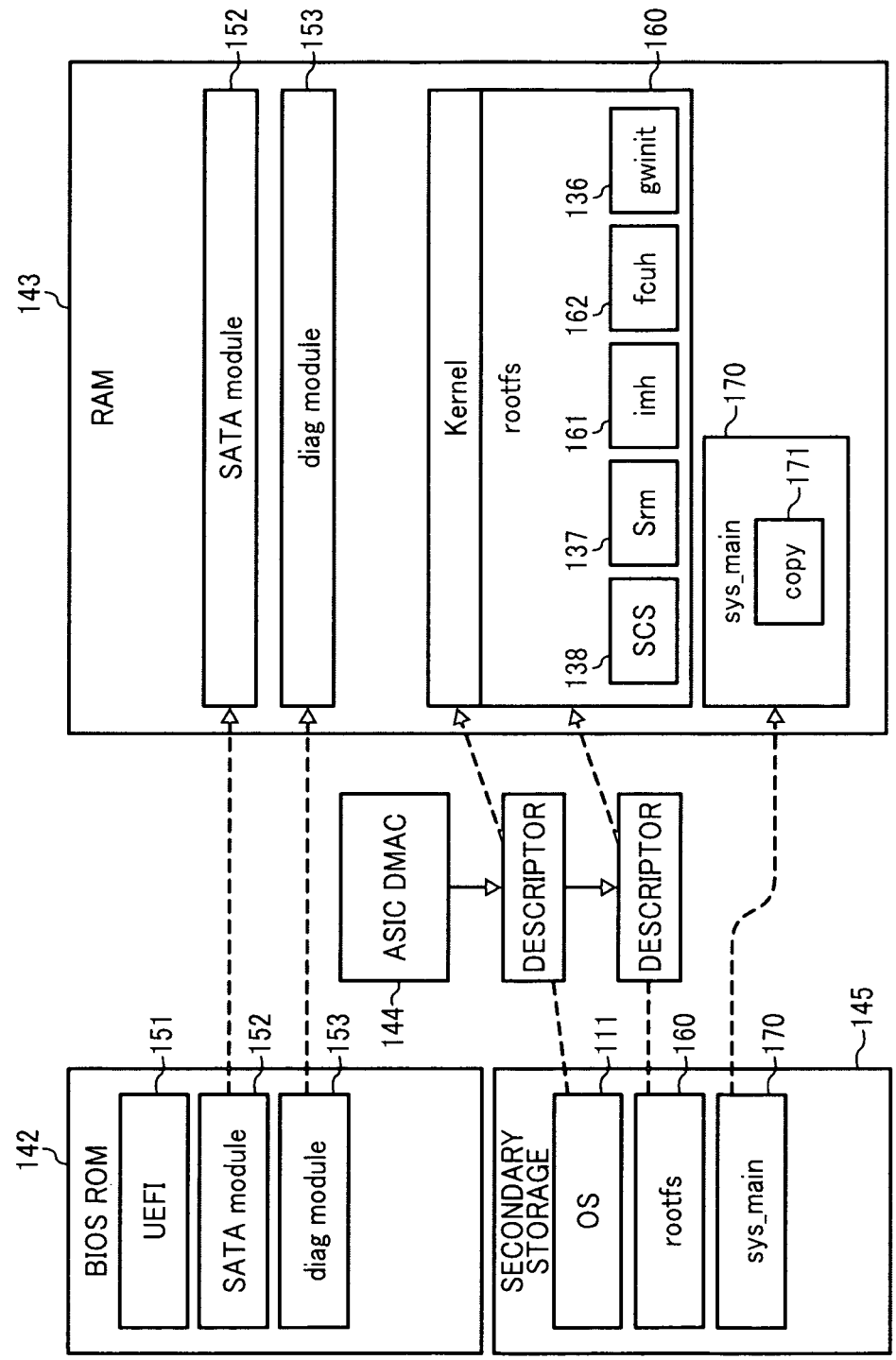
FIG. 18 is a schematic block diagram illustrating data arrangements in a ROM, RAM, and secondary storage of the controller section of FIG. 17.

As illustrated in FIG. 18, the BIOS ROM 142 includes a UEFI 151, SATA module 152, and diag module 153. The UEFI 151 functions as an execution control program such as a boot loader, which loads an OS 111 from the secondary storage 145 for execution. In this example, the UEFI is generated in compliance with Unified EFI Forum. The SATA module 152 is a module in compliance with the interface standards such as a serial advanced technology attachment (SATA), and connects the ROM 142 with the secondary storage 145. The diag module 152 is diagnosis program.

In this example, by executing the execution control program in the BIOS ROM 142, the image forming apparatus 100 is able to control execution of software, by effectively reducing the time required for writing software needed for execution onto the RAM 143 and thus reducing the overall time for execution of the image forming apparatus 100. The BIOS ROM 142 further stores an initialization program. When the power of the image forming apparatus 100 is turned on, the initialization program is executed to initialize processing related to input or output that may be required by architecture.

The RAM 143 functions as a work memory of the CPU 141. The OS in the secondary storage 145 is deployed in the RAM 143.

The CPU 141 controls various devices in the image forming apparatus 100 according to the OS deployed in the RAM 143 or the application programs to cause the image forming apparatus 100 to perform operation.

The ASIC 144, which is provided between the secondary storage 145 and the bus 146, includes a DMAC, compressor, and expander. The ASIC 144 transfers data between the secondary storage 145 and the other device such as the BIOS ROM 142 or the RAM 143 using the DMAC. The ASIC 144 may further expand compressed data using the expander, or compresses data using the compressor.

The secondary storage 145 is implemented by a Nand-Flash memory in compliance with the SATA commands. As illustrated in FIG. 18, the secondary storage 145 includes an operating system (OS) 111, a rootfs 160 functioning as a file system image, and a sys_main 170 functioning as a central program of the OS 111. The rootfs 160 is a file system to be mounted by rootfilesystem of the OS 111, and is a file system image that stores a group of files that are needed for execution of the image forming apparatus 100.

Since the Nand-Flash memory in compliance with SATA commands is used for the secondary storage 145, the ASIC 144 is provided with a logic, or a function, that controls writing or reading of data with respect to the secondary storage 145 via SATA.

The execution control program may be previously stored in a computer readable recording medium such as a ROM, EEPROM, EPROM, flash memory, flexible disk, CD-ROM, CD-RW, DVD, SD card, and MO. When the execution control program is loaded from the recording medium onto a memory of the image forming apparatus 100 such as the BIOS ROM 142, the image forming apparatus 100 performs operation that can effectively reduce time required for writing software needed for execution onto a memory such as the RAM 143. The execution control program, which may be executable by a general-purpose computer, may be written in legacy programming language such as assembler, C, C++, C#, and Java, or object oriented programming. The execution control program may be stored in any desired recording medium for distribution as described above. Alternatively, the execution control program may be previously stored in a memory of any desired device or apparatus, from which the image forming apparatus 100 can download, for example, through a wired or wireless network.

Referring to FIG. 16, the controller 101 additionally includes a SD card slot 147 and the other hardware devices ("OTHER") 148. The SD card slot 147 is inserted with a SD card 150, which stores an installer as described below.

The software 110 is provided with an application layer 120 and a platform 130, which operate under the OS 111. The application layer 120 sends a processing request to the platform 130 through an application program interface (API) 112.

The application layer 120 includes a plurality of application programs each performing specific processing to provide user services related to image formation. In this example, the application layer 120 includes a printer application ("PRINTER") 121, a copy application ("COPY") 122, a facsimile application ("FAX") 123, a scanner application ("SCANNER") 124, a net file application ("NET FILE") 125, a process check application (PROCESS CHECK) 126, and a PRU application 127. The net file application 125 controls data transmission or reception through the network. The process check application 126 checks processes. The PRU application 127 controls remotely updating of the ROM 142.

The platform 130 includes an engine control service (ECS) 131, memory control service (MCS) 132, operation panel control service (OCS) 133, fax control service (FCS) 132, network control service (NCS) 135, and gwinit 136 functioning as an initial execution user program. These modules may be collectively referred to a controller service layer, which analyzes the processing request received from the application layer 120 and generates a request to be sent to the hardware resources 140. The platform 130 further includes a system resource manager (SRM) 137, which manages the hardware resources 140 to arbitrate the requests from the control service layer, and includes a system control service (SCS) 138. The SRM 137 is a module that controls systems and resources. The SCS 138 is a module that manages execution or completion of the applications 121 to 127 in the application layer 120 according to the commands.

The ECS 131 is a module that controls the engine 103. The MCS 132 is a module that controls memory spaces. The OCS 133 is a module that controls the operation unit. The FCS 134 is a module that controls fax communication. The NCS 135 is a module that controls communication between the network and each of the applications 121 to 127 in the application layer 120. The gwinit 136, which is the initial execution user program, executes processes that are needed for the systems, and functions substantially the same as the init program which operates under the UNIX.

The BIOS ROM 142, the RAM 143, and the secondary storage 145 have a data structure as illustrated in FIG. 18. Upon execution of the image forming apparatus 100, the UEFI 1151 in the BIOS ROM 142 copies the SATA module 152 and the diag module 153 onto the RAM 143. The OS 111, the rootfs 160, and the sys_main 170 in the secondary storage 145 are copied onto the RAM 143 by the DMAC in the ASIC 144.

Now, operation of executing the image forming apparatus 100 is explained according to an example embodiment of the resent invention. The image forming apparatus 100 executes the execution control program so as to effectively reduce time required for writing software needed for execution onto the RAM 143 to reduce the execution time. Further, installation of software onto the secondary storage 145 is performed concurrently for a plurality of files to increase the processing speeds.

Figure 19:
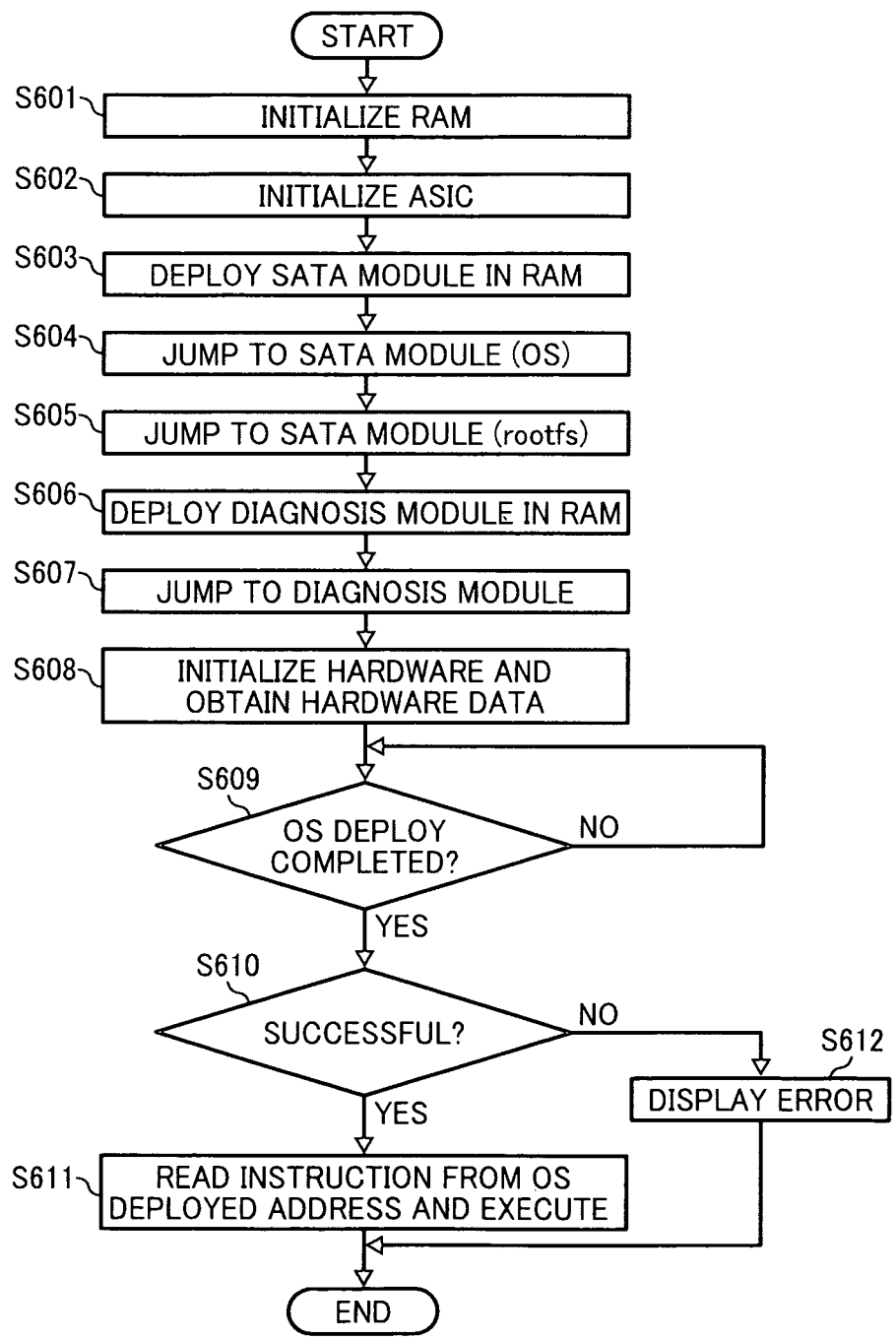
FIG. 19 is a flowchart illustrating operation of boot loader processing, performed by the image forming apparatus of FIG. 16.

The image forming apparatus 100 is stored with the UEFI 151 in the BIOS ROM 142. When the power of the image forming apparatus 100 is turned on, the CPU 141 executes the UEFI 151 to perform boot loader processing as illustrated in FIG. 19.

At S601, the UEFI 151 initializes the RAM 143, that is, initializes the RAM controller. At S602, the UEFI 151 initializes the ASIC 5.

At S603, the UEFI 151 instructs the CPU 141 to deploy the SATA module 152 onto the RAM 142 such that the SATA module 152 can be used by the OS 111. As illustrated in FIGS. 18, at S604 and S605, the DMAC in the ASIC 144 deploys the OS 111 and the rootfs 160 onto the RAM 143. FIG. 20 illustrates an example structure of the descriptor used by the DMAC. The descriptor of FIG. 20 includes a block number assigned to the blocks in the secondary storage from which data is transferred ("SECONDARY STORAGE BLOCK NUMBER"), the size of data subjected for transfer ("TRANSFER DATA SIZE"), a destination transfer memory address to which data is transferred ("DESTINATION TRANSFER ADDRSS"), and a control bit, each of which is 4 byte in size. In this example, the control bit is left blank.

In this example, the OS 111 and the rootfs 160 are deployed in the RAM 143 using the DMAC in the ASIC 144. Accordingly, the CPU 141 is able to diagnose the hardware resources, which usually takes time, at the same time the DMAC is deploying the OS 111 and the rootfs 160, thus reducing the execution time of the image forming apparatus 100.

As illustrated in FIG. 18, the rootfs 160 includes the SRM 137, SCS 138, IMH 161, FCUH 162, and gwinit 136.

The SCS 138 is a state management program of the system. For example, the SCS 138 controls the change in operation mode of the image forming apparatus 100 between a normal operation mode and an energy save mode. Unless the SCS 138 is executed, the state of the other programs is not managed. The SCS 138 controls execution or completion of the applications 121 to 127 of the application layer 120 according to the commands.

The SRM 137 is a communication program that controls communication with the engine 103. Upon execution of the image forming apparatus 100, the SRM 137 sends a command to the engine 103 to initialize the engine 103. The IMH 161 is a program that controls management or initialization of an image memory as well as handling of image data. The FCUH 162 is a program that controls hardware of a facsimile device when the facsimile device is mounted on the image forming apparatus 100. As described above, the gwinit 136 is the initial execution user program, which executes processes that are necessary for the systems.

Referring back to FIG. 19, at S606, the UEFI 1151 instructs the CPU 141 to deploy the diag module 153 from the BIOS ROM 142 onto the RAM 143. At S607, the UEFI 1151 jumps to the diag module 153.

At S608, the UEFI 1151 initializes the hardware resources other than the RAM 143 and the ASIC 144, and obtains information regarding the hardware resources.

At S609, the UEFI 151 determines whether deployment of the OS 111 by the DMAC is completed. When it is determined that deployment of the OS 111 is completed ("YES" at S609), at S610, the UEFI 151 checks whether deployment was successful. More specifically, the UEFI 1151 determines whether transfer of the OS 111 by the DMAC is successfully performed using the value of a DMA transfer register in the ASIC 144 as illustrated in FIG. 21. Referring to FIG. 21, "COMP" having the bit 0 is a bit used for determining whether DMA transfer successfully ends. The COMP with the value "1" indicates that DMA transfer successfully ends. The COMP with the value "0" indicates that DMA transfer is not completed or ends in error. The "ERR" having the bit 1 is a bit used for determining whether DMA transfer ends in error. The ERR with the value "1" indicates that DMA transfer successfully ends. The ERR with the value "0" indicates that DMA transfer is being performed or ends in error. The "DETAIL" having the bit 2 to 5 indicates a factor of the error when DMA transfer ends in error. When DMA transfer successfully ends, the DETAIL has the value "0".

Referring back to FIG. 19, when it is determined that deployment of the OS 111 was successful ("YES" at S610), the operation proceeds to S611. At S611, the UEFI 1151 causes the CPU 141 to read an instruction from the deployed address of the OS 111 and execute the instruction, and the operation ends.

When it is determined that deployment of the OS 111 was not successful ("NO" at S610), the operation proceeds to S612. At S612, the UEFI 151 causes the operation unit 103 to display an error message through a display 104, for example, as illustrated in FIG. 22. Referring to FIG. 22, the display 104 of the operation unit 103 displays an operation system deployment error notification screen G1. In addition to the display 104, the operation unit 103 is provided with various operational keys such as a ten key 105, a copy key 106, and a cancel key 107. The error notification screen G1 of FIG. 22 displays a message indicating that a data deployment error is generated with an error code and a specific code. The specific code may be a block number assigned to an address where data to be deployed is stored, which is obtainable from the descriptor of FIG. 20. After the error message is displayed, the operation ends.

Figure 23:
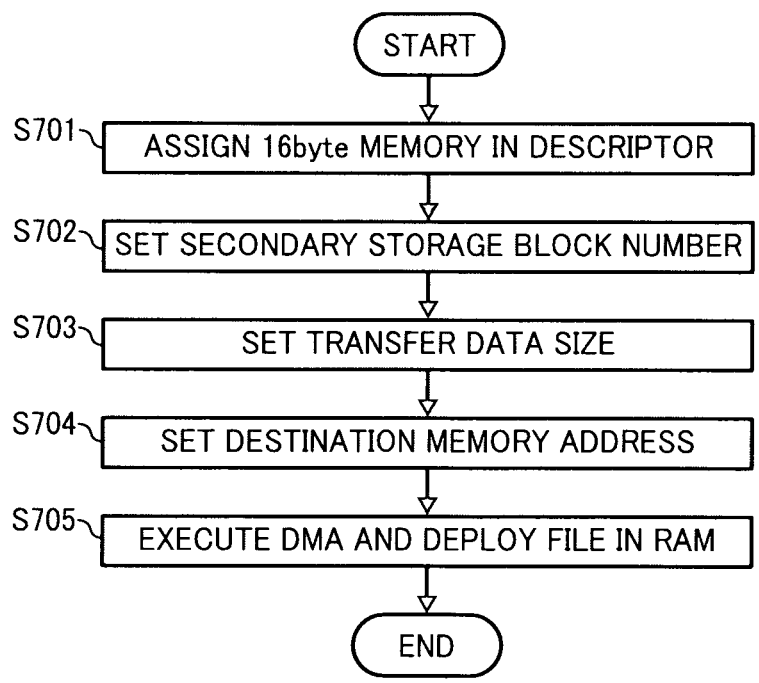
FIG. 23 is a flowchart illustrating operation of transferring a file using a SATA module, performed by the image forming apparatus of FIG. 16.

Referring now to FIG. 23, operation of transferring files from the secondary storage 145 onto the RAM 143 using the SATA module 152, performed by the UEFI 151, is explained according to an example embodiment of the present invention. The CPU 141 performs operation of FIGS. 23 at S604 and S605 of FIG. 19 under control of the UEFI 151.

At S701, as illustrated in FIG. 20, the UEFI 151 assigns the 16 byte memory space of the descriptor to prepare for file transfer using the SATA module 152.

At S702, the UEFI 151 sets a block number of the blocks in the secondary storage 145 from which the file is transferred. At S703, the UEFI 151 sets a transfer data size.

At S704, the UEFI 151 sets a memory address in the RAM 143 to which the file is transferred. At S705, the UEFI 151 executes the DMAC to start deploying the file that is stored in the secondary storage 145 in a compressed form, onto the specific address memory in the RAM 143, and the operation ends to proceed to S606 of FIG. 19.

Figure 24:
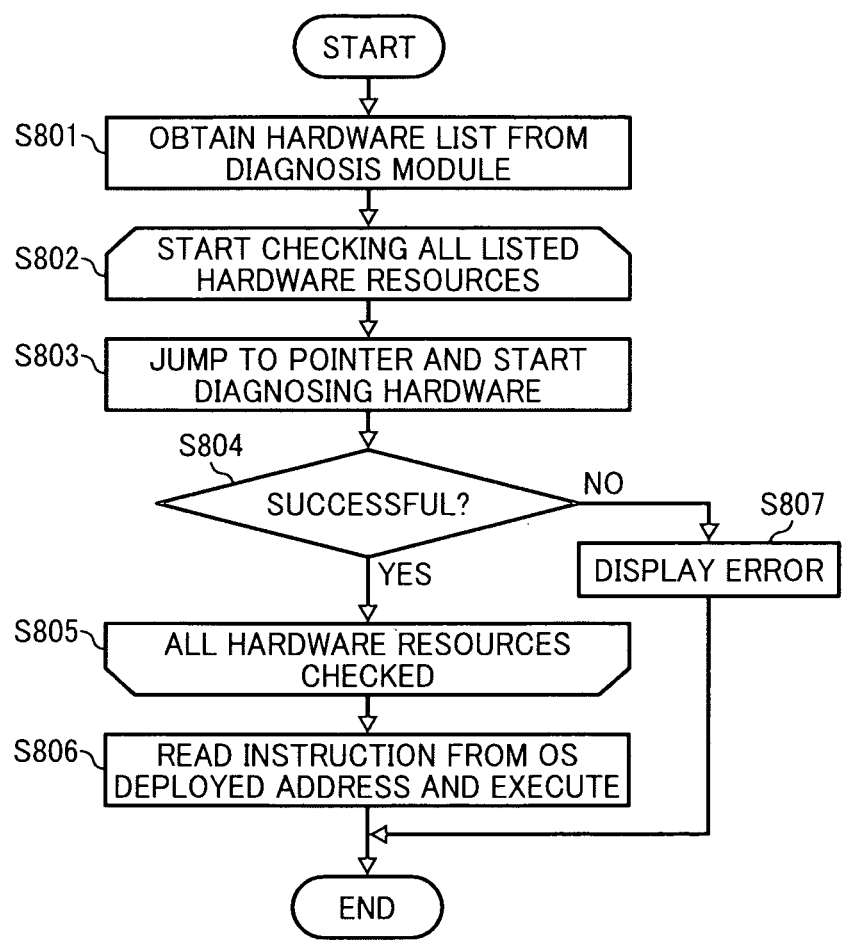
FIG. 24 is a flowchart illustrating operation of diagnosing hardware resources using a diagnosis module, performed by the image forming apparatus of FIG. 16.

Referring now to FIG. 24, operation of diagnosing the hardware resources, performed by the diag module 153 under control of the UEFI 151, is explained according to an example embodiment of the present invention. The CPU 141 performs operation of FIG. 24 at S607 of FIG. 19, using the diag module 153 which operates under control of the UEFI 151.

The UEFI 151 obtains a list of hardware resources that is stored in the diag module 153 in the form of variables at S801, and starts loop processing of diagnosing all hardware resources at S802.

At S803, the diag module 153 jumps to a diagnosis function pointer obtained from the hardware resources list to start diagnosing a specific hardware resource specified by the pointer. At S804, the diag module 153 determines whether diagnosis of the specific hardware resource was successful.

When it is determined that diagnosis of the specific hardware resource was successful ("YES" at S804), the operation proceed to S805 to determine whether all hardware resources have been checked. When it is determined that all hardware resources have not been checked ("NO" at S805), the operation returns to S802 to repeat S803 to S805.

When it is determined that all hardware resources have been checked ("YES" at S804), the operation proceeds to S806. At S806, the UEFI 1151 causes the CPU 141 to read an instruction stored in the deployed address of the OS 111 and execute the instruction, and the operation ends.

When it is determined that diagnosis of the specific hardware resource was not successful ("NO" at S804), the operation proceeds to S807 to display an error message through the display 104 of the operation unit 103.

Figure 25:
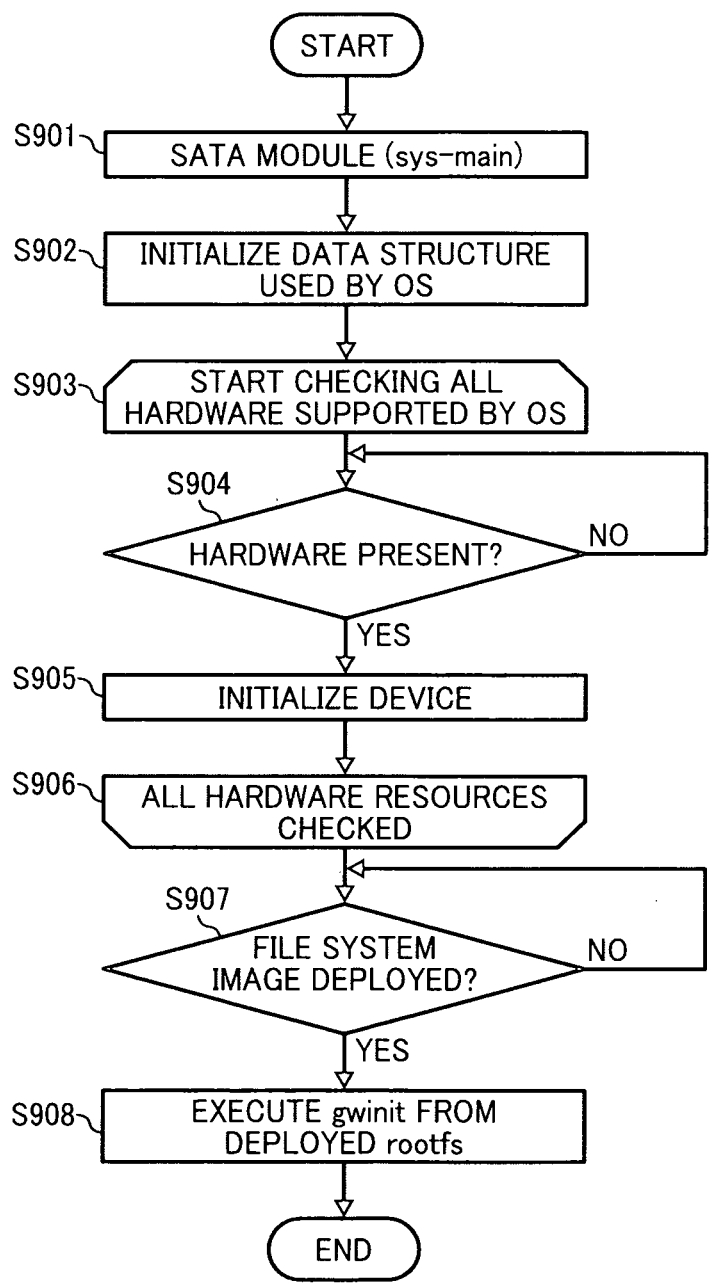
FIG. 25 is a flowchart illustrating operation of executing the operating system, performed by the image forming apparatus of FIG. 16.

Referring now to FIG. 25, operation of executing the operating system, performed by the CPU 141 after or in currently with deploying the OS 11 and the rootfs 160 onto the RAM 143, is explained according to an example embodiment of the present invention.

At S901, the CPU 141 causes the SATA module 152 to deploy the OS 111 in the secondary storage 145, specifically, the sys_main 170, onto the RAM 143.

At S902, the CPU 141 initializes a data structure to be used by the OS 111. The copy 171 in the sys_main 170 is a module needed for performing the copy function of the image forming apparatus 100.

At S903, the CPU 141 starts loop processing of determining whether all hardware resources supported by the OS 111 are checked. At 904, the CPU 141 determines whether any hardware resource that has not been checked is present. When it is determined that there is at least one hardware resource for checking ("YES" at S904), the operation proceeds to S905 to initialize a specific hardware resource that is found. At S906, the CPU 141 determines whether all hardware resources supported by the OS 111 have been checked. When it is determined that all hardware resources have not been checked ("NO" at S906), the operation returns to S904 to repeat S904 to S906.

When it is determined that all hardware resources supported by the OS 111 have been checked ("YES" at S906), the operation proceeds to cause the DMAC to deploy the rootfs 160, i.e., the file system image, onto the RAM 143. When it is determined that deployment of the file system image is completed ("YES" at S907), the operation proceeds to S908 to execute the gwinit 136 from the deployed rootfs 160 to execute processes.

Referring now to FIGS. 25 to 29, operation of installing software, performed by the CPU 141, is explained according to an example embodiment of the present invention.

In a substantially similar manner as described above for the example case of the information processing apparatus 1, the image forming apparatus 100 installs files in the SD card 150 onto the secondary storage 145 with increased processing speeds.

Figure 26:
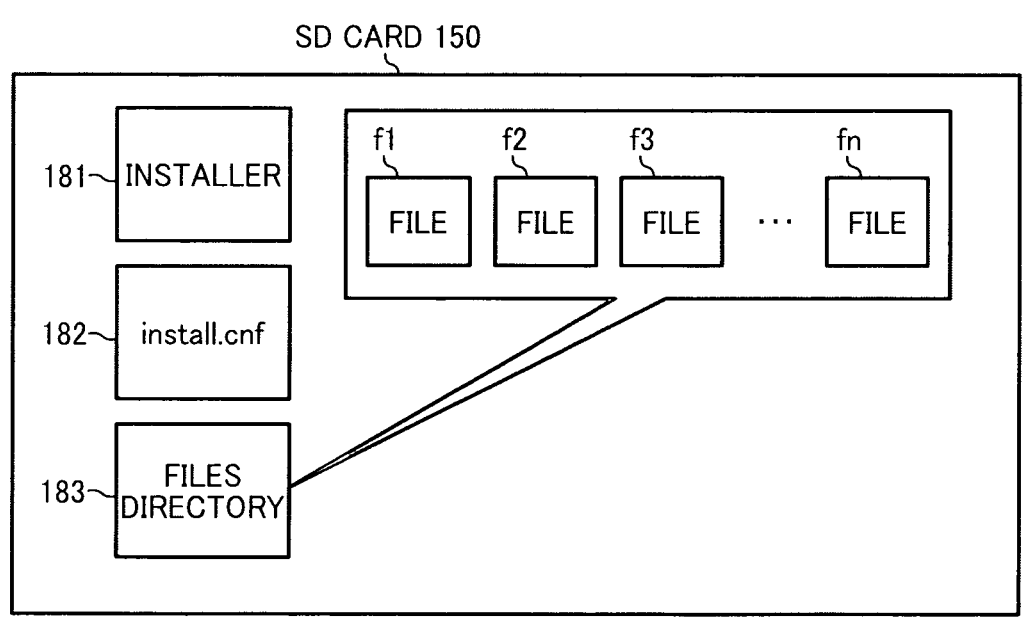
FIG. 26 is an illustration for explaining a file structure of an external device connected to the image forming apparatus of FIG. 16.

As illustrated in FIG. 26, the SD card 150 stores therein an installer 181, install.cnf 182, and files directory 183 that stores a plurality of files f1 to fn subjected for installing. In this example, the install.cnf 182 functions as the installer software 12 of FIG. 8 to control operation of installing the files onto the secondary storage.

The installer 181 searches the files directory 183 for the files f1 to fn, which are specified by the install.cnf 182, and copies the files f1 to fn onto the secondary storage 145 of the image forming apparatus 100 using a plurality of DMACs in the ASIC 144. The operation of copying the files is performed in a substantially similar manner as described above referring to the example case of the information processing apparatus 1.

Figure 27:
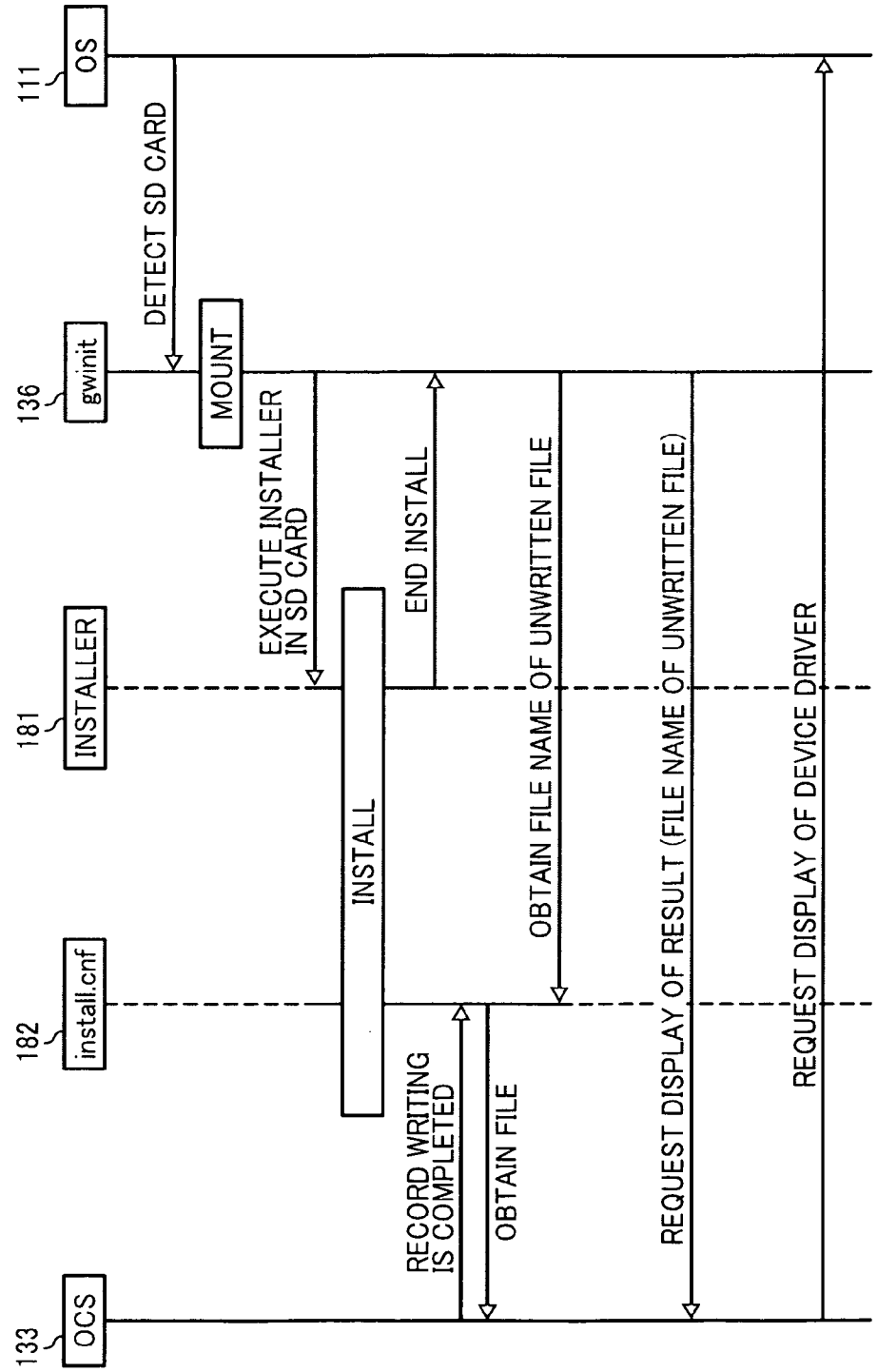
FIG. 27 is a data sequence diagram illustrating operation of installing files of software stored in the external device onto the image forming apparatus of FIG. 16.

The CPU 141 of the image forming apparatus 100 performs operation of installing software, for example, as illustrated in FIG. 27.

When the SD card 150 is inserted to the SD card slot 147, the OS 111 notifies the gwinit 136 that the SD card 150 is detected. The gwinit 136 performs mounting process to cause the files in the SD card 150 to be accessible through the file system.

After mounting process, the gwinit 136 executes the installer 181. The installer 181 specifies the files f1 to fn in the files directory 183 using the install.cnf 182, and starts copying the files f1 to fn onto the secondary storage 145 in a predetermined order using a plurality of DMACs in the ASIC 144. Each time one file is copied onto the secondary storage 145, the installer 181 notifies the gwinit 136 that installation is completed. For example, the installer 181 sends a return value of the request received from the gwinit 136, with the value "0" indicating that installation was successful and the value "1" indicating that installation was not successful.

When the gwinit 136 receives notification indicating that installation ends in error, the gwinit 136 obtains a file name of the unprocessed file from the install.cnf 182 such that the file name of the file that is not processed due to the error is displayed.

When the gwinit 136 receives notification indicating that installation is completed, the gwinit 136 requests the OCS 133 to display the processing results. In case installation ends in error, the gwinit 136 sends information regarding the file name of the unprocessed file obtained from the install.cnf 182 to the OCS 133.

In response to the request for displaying the processing results from the gwinit 136, the OCS 133 requests a device driver of the OS 111 to display the processing results. The OCS 133 is a user process that performs the function of displaying the display 104 of the operation unit 103 to display characters or images. Through calling the device driver of the OS 111, the OCS 133 controls operation of the operation unit 103.

Figure 28:
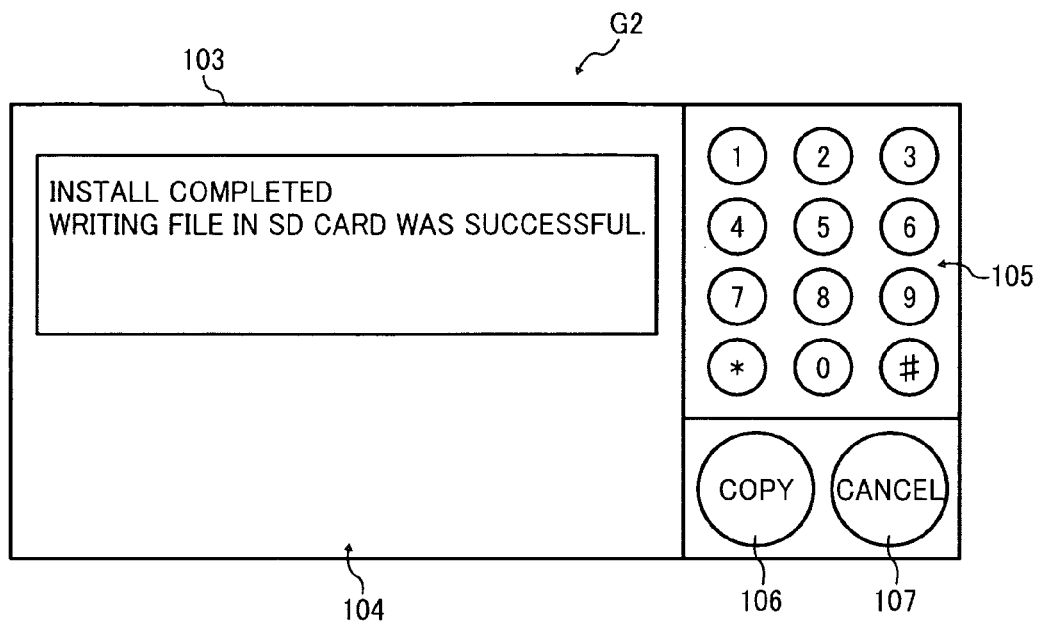
FIG. 28 is an illustration for explaining an installation notification screen, displayed by the image forming apparatus of FIG. 16, to notify that installation was successful.
Figure 29:
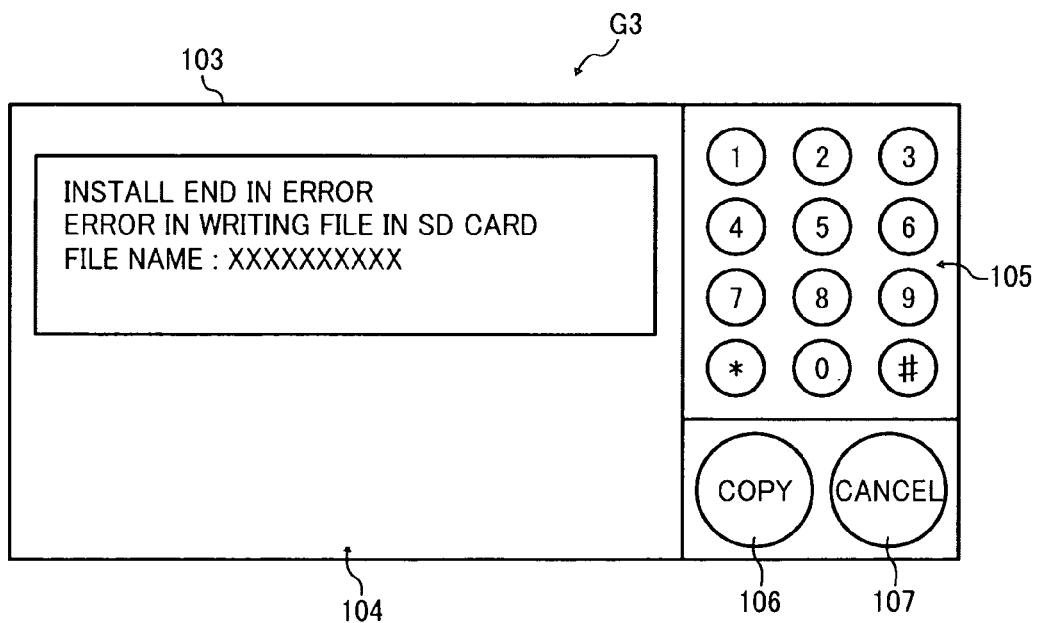
FIG. 29 is an illustration for explaining an installation notification screen, displayed by the image forming apparatus of FIG. 16, to notify that installation was not successful.

When installation was successful, the OCS 133 causes the display 104 of the operation unit 103 to display an installation notification screen G2, for example, as illustrated in FIG. 28. When installation was not successful, the OCS 133 causes the display 104 of the operation unit 103 to display an installation error notification screen G3, for example, as illustrated in FIG. 29.

After installation of software, the installer 181 records in the instsall.cnf 182 that writing is completed. In case an error occurs in installing a specific file, information regarding the specific file that is not processed due to the error is recorded. By referring to the install.cnf, the OCS 133 instructs the display 104 of the operation unit 103 to display information regarding the unprocessed file.

As described above, the image forming apparatus 100 performs initialization of hardware resources needed for execution, and DMA transfer of the operating system and the file system image, concurrently. In DMA transfer, the image forming apparatus 100 executes a plurality of DMACs in the ASIC 144 to expand the OS 111 and the file system image (rootfs) 160 stored in the nonvolatile memory such as the secondary storage 145 using the expander in the ASIC 144, and transfers the expanded OS and the file system image to the volatile memory such as the RAM 143.

In this manner, at the same time the CPU 141 executes software, the CPU 141 is able to deploy the OS 111 and the file system image 160 from the secondary storage 145 into the RAM 143 using the plurality of DMACs in the ASIC 144, thus executing the image forming apparatus 100 at high speeds.

The image forming apparatus 100 is set so as to start writing the expanded OS 111 at a predetermined fixed writing start position in the RAM 143, and writes information regarding the size of the expanded operating system in the RAM 4. Using the writing start position and the size of the expanded operating system, the image forming apparatus 100 determines the end address of the space where the operating system is written, and sets the determined end address to a position from which the file system image is written.

In this manner, the image forming apparatus 100 is able to correctly know the space where each file, such as the OS and the file system image, is to be deployed in the memory beforehand, thus allowing the effective use of the memory space in the RAM 143 while suppressing data from being overwritten.

Further, in the above-described example, when initialization of the hardware resources ends before completion of transfer of the operating system, the image forming apparatus 100 holds execution of the operating system 111 at least until transfer of the OS 111 is completed. For example, even if processing of software executed by the CPU 141 ends before deployment of the OS 111 by DMAC, the CPU 141 waits until deployment of the OS 111 by DMAC is completed. This prevents the CPU 141 from using any file that may not have been deployed in error, thus improving robustness of the image forming apparatus 100.

The image forming apparatus 100 executes the plurality of DMACs in parallel to cause the DMACs to transfer the OS 111 and the sys_main 170 from the secondary storage 145 onto the RAM 143. Accordingly, the OS 111 to be executed can be deployed from the secondary storage 145 onto the RAM 143 with increased speeds.

The image forming apparatus 100 executes the plurality of DAMCs 21a and 21b, concurrently, to compress the software, the files f1 to fn, stored in the external device such as the external memory (SD card) 150 using the compressor, and install the compressed software onto the secondary storage. Accordingly, the image forming apparatus 100 is able to install the files needed for execution of the image forming apparatus 100 from the external memory onto the secondary storage 145 with increased speeds at least when compared with the case where installation is performed only by the CPU 141.

The image forming apparatus 100 divides the files f1 to fn stored in the external memory 150 into a plurality of blocks each having a predetermined size. The image forming apparatus 100 executes the plurality of DMACs concurrently to compress each block of the file using the compressor, and install the compressed block onto the secondary memory 145. The image forming apparatus 100 reserves a transfer destination space having a block unit size of the file by setting the variable H to the "reserved" status. When the block of the compressed file is transferred to the transfer destination space, an unused area of the transfer destination space that has been reserved is released for use as a transfer destination space for another file.

Thus, it is not necessary to perform the following sequential operation for each file at a time, such as copying a current file onto the secondary storage 145, obtaining the end address of the copied file, and copying a next file from the end address. In contrary, in the above-described example, the installer software (install.cnf) 182 is able to know which block is being used based on the variable H assigned to each block such that a plurality of DMACs may be executed to concurrently perform operation of copying a plurality of files.

Further, the image forming apparatus 100 may divide the file stored in the external memory 150 into a plurality of unit blocks each having a predetermined size, and execute a plurality of DMACs to concurrently install the plurality of blocks of the file in a compressed format onto the secondary storage 145. Even if the file size of the block after being compressed is not known, the position from which writing of the block starts, and the size of the block, may be specified.

Numerous additional modifications and variations are possible in light of the above teachings. It is therefore to be understood that within the scope of the appended claims, the disclosure of the present invention may be practiced otherwise than as specifically described herein.

With some embodiments of the present invention having thus been described, it will be obvious that the same may be varied in many ways. Such variations are not to be regarded as a departure from the spirit and scope of the present invention, and all such modifications are intended to be included within the scope of the present invention.

For example, the execution control program may be stored in a memory of any desired information processing apparatus to cause the information processing apparatus to perform operation of executing the information processing apparatus with less execution time. Examples of the information processing apparatus include, but not limited to, the information processing apparatus 1 such as the general-purpose computer, the image forming apparatus 100 such as the MFP, a personal assistant device (PDA) such as a portable phone, a car navigation system, a communication terminal, etc.

Further, elements and/or features of different illustrative embodiments may be combined with each other and/or substituted for each other within the scope of this disclosure and appended claims.

As described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, nonvolatile memory cards, ROM (read-only-memory), etc. Alternatively, any one of the above-described and other methods of the present invention may be implemented by ASIC, prepared by interconnecting an appropriate network of conventional component circuits or by a combination thereof with one or more conventional general purpose microprocessors and/or signal processors programmed accordingly.

In one example, the present invention may reside in an information processing apparatus, an execution control method, an execution control program, and an execution control medium that stores the execution control program, each of which is capable of concurrently perform: (1) initializing hardware resources needed for execution of the information processing apparatus; and (2) expanding an operating system and a file system image stored in a nonvolatile memory in a compressed format and transferring the expanded operating system and file system image to a volatile memory using a DMA controller.

For example, the information processing apparatus includes a nonvolatile memory that stores an operating system and a file system image in a compressed format; a DMA controller that DMA transfers the operating system and the file system image from the nonvolatile memory to a volatile memory; an expander that expands the operating system and the file system image to be DMA transferred; and an execution controller that concurrently performs initialization of hardware resources needed for execution and executing the DMA controller to cause the DMA controller to transfer the expanded operating system and the expanded file system image.

Further, a writing start position from which the expanded operating system is written is previously set in the volatile memory, and the size of the expanded operating system is written in the nonvolatile memory. Based on the writing start position and the size of the expanded operating system, the end address of the expanded operating system written in the nonvolatile memory is determined and set to a writing start position from which the file system image is written.

If initialization of the hardware resources is completed before transfer of the operating system, the execution controller holds execution of the operating system until transfer of the operating system is completed.

The execution controller further executes a plurality of DMA controllers to concurrently perform transfer of the operating system and the file system image.

The execution controller further executes a plurality of DMA controllers to concurrently perform installation of files from an external device connected through an interface into the nonvolatile memory, after compressing the files using a compressor.

With the execution controller, time required for writing software needed for execution of the information processing apparatus onto the volatile memory is greatly reduced, thus reducing the execution time of the information processing apparatus. Further, installation of software programs onto the nonvolatile memory is performed with the increased processing speeds.

In another example, the present invention may reside in: an information processing apparatus including: a nonvolatile memory to store an operating system and a file system in a compressed format; DMA control means for DMA transferring the operating system and the file system image from the nonvolatile memory to a volatile memory; expanding means for expanding the compressed operating system and the compressed file system image before being transferred; and execution control means for executing the DMA control means in concurrently with initialization of hardware resources needed for execution.

The information processing apparatus further includes address set means, which specifies in the volatile memory a predetermined start writing position from which the expanded operating is written, records information indicating a size of the expanded operating system in the volatile memory, determines an end address of the expanded operating system in the volatile memory based on the start writing position and the size of the expanded operating system, and sets the determined end address of the expanded operating system to a start writing position in the volatile memory from which the file system image is written.

The execution control means determine whether transfer of the operating system is completed before initialization of the hardware resources is completed, and holds execution of the operating system until transfer of the operating system is completed.

The DMA controller includes a plurality of DMA controllers. The execution control means executes the plurality of DMA controllers to cause the plurality of DMA controllers to concurrently transfer the operating system and the file system image.

The information processing apparatus further includes: compress means for compressing data, interface means for connecting the information processing apparatus to an external device, the external device storing therein software programs; and installer means for executing the plurality of DMA controllers to cause the plurality of DMA controllers to concurrently compress the software programs and install the software programs into the nonvolatile memory.

The information processing apparatus further includes: compress means for compressing data, interface means for connecting the information processing apparatus to an external device, the external device storing therein software programs; installer means for dividing the software programs stored in the external device into a plurality of unit blocks each having a predetermined size, and execute the plurality of DMA controllers to cause the plurality of DMA controllers to concurrently compress the blocks of the programs and install the blocks of the programs into the nonvolatile memory; and installer controller means for reserving a transfer destination area having the size of the blocks of the programs in the nonvolatile memory, specifying an unwritten area in the transfer destination area in which no data is written after transfer of the blocks of the programs to the reserved transfer destination area is completed, and releasing the reserved status of the unwritten area in the transfer destination area for use by a transfer destination area for the following file.

What is claimed is:

1. An information processing apparatus, comprising:
a nonvolatile memory configured to store an operating system and a file system image each in a compressed format;
a volatile memory;
an integrated circuit coupled to the nonvolatile memory and the volatile memory and configured to expand the operating system and the file system image using an expander, and to transfer the expanded operating system and the expanded file system image from the nonvolatile memory to the volatile memory using a direct memory access (DMA) controller such that the expanded operating system and the expanded file system are written in the volatile memory, the DMA controller including a plurality of DMA controllers;
a processor to execute the DMA controller so as to cause the DMA controller to start transferring the expanded operating system and the expanded file system image to the volatile memory in concurrently with initialization of hardware resources needed for execution of the information processing apparatus, the processor executing the plurality of DMA controllers to cause the plurality of DMA controllers to concurrently transfer the expanded operating system and the expanded file system image to the volatile memory;
obtain information indicating a predetermined operating system start writing position in the volatile memory, wherein the DMA controller writes the expanded operating system from the operating system start writing position;
obtain information indicating a size of the expanded operating system that is previously stored in the volatile memory;
determine an end address of the expanded operating system in the volatile memory based on the operating system start writing position and the size of the expanded operating system; and
set the determined end address of the expanded operating system to a file system image start writing position in the volatile memory, wherein the DMA controller writes the expanded file system image from the file system image start writing position.

2. The information processing apparatus of claim 1, wherein, when initialization of the hardware resources is completed, the processor is further configured to:
determine whether the DMA controller completes transferring of the expanded operating system; and
hold execution of the operating system until the DMA controller completes transferring of the expanded operating system.

3. The information processing apparatus of claim 1, further comprising:
an interface to connect the information processing apparatus to an external device, the external device storing therein a plurality of files and an installer to cause the processor to install the plurality of files onto the information processing apparatus, wherein
the processor is further configured to execute the plurality of DMA controllers to cause the plurality of DMA controllers to concurrently compress the plurality of files using a compressor and transfer a plurality of compressed files from the external device to the nonvolatile memory such that the plurality of compressed files are written in the nonvolatile memory.

4. The information processing apparatus of claim 3, wherein, for each file of the plurality of files stored in the external device, the processor is further configured to:
divide the file into a plurality of blocks each having a predetermined size;
reserve a transfer destination area having the size of the blocks of the file in the nonvolatile memory to cause one of the DMA controllers to transfer the compressed file to the transfer destination area;
specify an unwritten area in the reserved transfer destination area in which no data is written after the compressed file is transferred to the reserved transfer destination area; and
release the reserved status of the unwritten area in the reserved transfer destination area.

5. A method of controlling execution of an information processing apparatus, the method comprising:
expanding an operating system and a file system image each stored in a nonvolatile memory of the information processing apparatus in a compressed format using a compressor;
transferring the expanded operating system and the expanded file system image from the nonvolatile memory to a volatile memory of the information processing apparatus using a direct memory access (DMA) controller such that the expanded operating system and the expanded file system are written in the volatile memory;
initializing hardware resources needed for execution of the information processing apparatus;

controlling a processor to concurrently perform the step of initializing the hardware resources and the step of transferring the expanded operating system and the expanded file system image;

executing a plurality of DMA controllers to cause the plurality of DMA controllers to concurrently perform transferring of the expanded operating system and transferring of the expanded file system;

obtaining information indicating a predetermined operating system start writing position in the volatile memory, wherein the expanded operating system is written from the predetermined operating system writing position;

obtaining information indicating a size of the expanded operating system that is previously stored in the volatile memory;

determining an end address of the expanded operating system in the volatile memory based on the operating system start writing position and the size of the expanded operating system; and setting the determined end address of the expanded operating system to a file system image start writing position in the volatile memory, wherein the expanded file system image is written from the file system image start writing position.

6. The method of claim 5, further comprising:

determining whether transferring of the expanded operating system is completed, when initialization of the hardware resources is completed; and holding execution of the operating system until transferring of the expanded operating system is completed.

7. The method of claim 5, further comprising:

detecting an external device connected to the information processing apparatus through an interface, the external device storing therein a plurality of files; and executing the plurality of DMA controllers to cause the plurality of DMA controllers to concurrently compress the plurality of files using a compressor and transfer a plurality of compressed files from the external device to the nonvolatile memory such that the plurality of compressed files are written in the nonvolatile memory.

8. The method of claim 7, for each file of the plurality of files stored in the external device, the method further comprising:

dividing the file into a plurality of blocks each having a predetermined size;

reserving a transfer destination area having the size of the blocks of the file in the nonvolatile memory to cause one of the DMA controllers to transfer the compressed file to the transfer destination area;

specifying an unwritten area in the reserved transfer destination area in which no data is written after the compressed file is transferred to the reserved transfer destination area; and releasing the reserved status of the unwritten area in the reserved transfer destination area.

9. A non-transitory recording medium storing a plurality of instructions which cause a processor to perform a method of executing an information processing apparatus, the method comprising:

expanding an operating system and a file system image each stored in a nonvolatile memory of the information processing apparatus in a compressed format using a compressor;

transferring the expanded operating system and the expanded file system image from the nonvolatile memory to a volatile memory of the information processing apparatus using a direct memory access (DMA) controller such that the expanded operating system and the expanded file system are written in the volatile memory;

initializing hardware resources needed for execution of the information processing apparatus;

controlling the processor to concurrently perform the step of initializing the hardware resources and the step of transferring the expanded operating system and the expanded file system image;

obtaining information indicating a predetermined operating system start writing position in the volatile memory, wherein the expanded operating system is written from the predetermined operating system writing position;

obtaining information indicating a size of the expanded operating system that is previously stored in the volatile memory;

determining an end address of the expanded operating system in the volatile memory based on the operating system start writing position and the size of the expanded operating system; and setting the determined end address of the expanded operating system to a file system image start writing position in the volatile memory, wherein the expanded file system image is written from the file system image start writing position.

* * * * *